(12) United States Patent
Kim et al.

(10) Patent No.: US 12,283,208 B2
(45) Date of Patent: Apr. 22, 2025

(54) CONNECTOR STRUCTURE AND ELECTRONIC DEVICE INCLUDING THE SAME

(71) Applicant: SAMSUNG ELECTRONICS CO., LTD., Suwon-si (KR)

(72) Inventors: Jeongsik Kim, Suwon-si (KR); Seunghoon Kim, Suwon-si (KR); Jongyeon Kim, Suwon-si (KR); Muyeol Lee, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/806,665

(22) Filed: Jun. 13, 2022

(65) Prior Publication Data
US 2022/0393380 A1    Dec. 8, 2022

Related U.S. Application Data

(63) Continuation of application No. PCT/KR2022/007283, filed on May 23, 2022.

(30) Foreign Application Priority Data

Jun. 3, 2021  (KR) .................. 10-2021-0072235

(51) Int. Cl.
*H01R 12/79* (2011.01)
*G09F 9/30* (2006.01)
*H01Q 1/24* (2006.01)

(52) U.S. Cl.
CPC ............. *G09F 9/301* (2013.01); *H01Q 1/243* (2013.01); *H01R 2201/02* (2013.01)

(58) Field of Classification Search
CPC .... G09F 9/301; H01Q 1/243; H01R 2201/02; H01R 12/79; H01R 12/712; H01R 13/629;
(Continued)

(56) References Cited

U.S. PATENT DOCUMENTS 9,531,087 B2   12/2016  Ying
10,116,346 B2  10/2018  Kim et al.
(Continued)

FOREIGN PATENT DOCUMENTS

| KR | 10-2018-0108147 A | 10/2018 |
| KR | 10-2019-0061161 A | 6/2019 |
| KR | 10-2019-0089955 A | 7/2019 |
| KR | 10-2020-0058153 A | 5/2020 |
| KR | 10-2021-0017066 A | 2/2021 |

OTHER PUBLICATIONS

International Search Report and Written Opinion of the International Searching Authority dated Aug. 29, 2022, in connection with International Application No. PCT/KR2022/007283, 9 pages.

*Primary Examiner* — Cindy Trandai

(57) ABSTRACT

An electronic device (ED) includes a first wireless communication path configured to enable wireless communication in a first frequency band, a second wireless communication path configured to enable wireless communication in a second frequency band, and a connector structure. The first wireless communication path includes a first frequency signal processing circuit, a flexible circuit board, a second frequency signal processing circuit, and a wireless communication modem. The second wireless communication path includes an antenna part formed by segmentation of a metal bezel, and the flexible circuit board. The connector structure includes a connector plug electrically connected to the flexible circuit board disposed in the ED, and a connector socket electrically connected to a printed circuit board disposed in the ED. The connector plug includes a connec-
(Continued)

tion pin configured to electrically connect a first plug pin disposed at a first side thereof and a second plug pin disposed at a second side.

9 Claims, 22 Drawing Sheets

(58) Field of Classification Search
CPC . H01R 13/6456; G06F 1/1616; G06F 1/1652; G06F 1/1698; H05K 1/14; H05K 1/144; H05K 2201/10136; H05K 2201/10189; H05K 2201/10265; H05K 2201/1031; Y02P 70/50

See application file for complete search history.

(56) References Cited

U.S. PATENT DOCUMENTS

| | | | |
|---|---|---|---|
| 10,305,205 B2* | 5/2019 | Yoshioka | H01R 13/405 |
| 2011/0111648 A1* | 5/2011 | Takeuchi | H01R 12/716 |
| | | | 439/884 |
| 2015/0200477 A1* | 7/2015 | Kim | H05K 1/144 |
| | | | 439/378 |
| 2018/0277934 A1 | 9/2018 | Kim et al. | |
| 2019/0165454 A1 | 5/2019 | Lee et al. | |
| 2020/0091608 A1 | 3/2020 | Alpman et al. | |
| 2020/0161763 A1* | 5/2020 | Lee | H01Q 25/00 |
| 2020/0212633 A1* | 7/2020 | Masunaga | H01R 12/79 |
| 2021/0098943 A1* | 4/2021 | Hayashi | H01R 13/6582 |
| 2021/0175649 A1* | 6/2021 | Amemori | H01R 12/716 |

* cited by examiner

FIG. 16

| THE DISCLOSURE | FREQUENCY | | |
|---|---|---|---|
| | 0 ~ 2.1 GHz | 2.5 ~ 4 GHz | 8 GHZ OR MORE |
| | -65dB | -60dB | -50dB |
| COMPARISON EXAMPLE | FREQUENCY | | |
| | 0.1 ~ 1 GHz | 1 ~ 6 GHz | 6 ~ 10 GHz |
| | -75dB | -70dB | -65dB |

CONNECTOR STRUCTURE AND ELECTRONIC DEVICE INCLUDING THE SAME

CROSS-REFERENCE TO RELATED APPLICATIONS

This application is a bypass continuation of International Application No. PCT/KR2022/007283, which was filed on May 23, 2022, which is based on and claims priority to Korean Patent Application No. 10-2021-0072235, filed on Jun. 3, 2021, in the Korean Intellectual Property Office, the disclosures of which are incorporated by reference herein their entirety.

BACKGROUND

1. Field

Various embodiments of the disclosure relate to a connector structure and an electronic device including the same.

2. Description of Related Art

Electronic devices have been developed to be thin, lightweight, compact, and multi-functional, and may have various components mounted therein, to this end, and may include a transmission line through which a signal (for example, RF (radio frequency) signal) can be transmitted. For example, as the transmission line, a printed circuit board (for example, PCB (printed circuit board), PBA (printed board assembly), R-FPCB (rigid-flexible PCB), FPCB (flexible printed circuit board) and/or FRC (flexible printed circuit board type RF (radio frequency) cable) may be applied.

As a result of combination of an New Radio (NR) band and an Evolved-Universal Terrestrial Radio Access-New Radio (ENDC) band of an electronic device and increase in UL CA (carrier aggregation), a Tx path is connected to multiple antennas, thereby requiring more RF switches.

SUMMARY

Electronic devices currently have limited mounting spaces, thereby making it difficult to secure a space in which an electronic component (for example, RF switch) can be mounted. Foldable or slidable electronic devices have recently been developed such that displays can be expanded. A foldable electronic device has a flexible display configured to be folded or unfolded, and a slidable electronic device has a flexible display configured to move in a sliding type such that the screen can be expanded and reduced. It may be difficult to secure a space to mount electronic components in the case of such a foldable or slidable electronic device.

An embodiment of the disclosure is directed to solve the restriction on the electronic component mounting space of an electronic device supporting 5G Sub6 and mmWave communication, and it is a technical aspect thereof to provide a connector structure having a direct connection path formed on a connector plug of a flexible circuit board (for example, FRC (flexible printed circuit board type RF (radio frequency) cable)) to be able to replace a SUB6 (or UWB) RF switch, and an electronic device including the same.

It is a technical aspect of an embodiment of the disclosure to provide a connector structure capable of forming a Sub6 (or UWB) path through electric fastening between a connector plug connected to an FRC and a connector socket disposed on a PCB, and an electronic device including the same.

It is a technical aspect of an embodiment of the disclosure to provide a connector structure for an RF switch with regard to each frequency band, and an electronic device including the same.

Technical aspects to be accomplished by the disclosure are not limited to the above-mentioned technical aspects, and other technical aspects not mentioned herein will be clearly understood from the following description by those skilled in the art to which the disclosure pertains.

An electronic device according to various embodiments of the disclosure may include a first wireless communication path configured to enable wireless communication in a first frequency band, a second wireless communication path configured to enable wireless communication in a second frequency band, and a connector structure. The first wireless communication path may include a first frequency signal processing module (e.g., circuit), a flexible circuit board, a second frequency signal processing module (e.g., circuit), and a wireless communication modem. The second wireless communication path may include an antenna part formed by segmentation of a metal bezel, and the flexible circuit board. The connector structure may include the connector plug electrically connected to a flexible circuit board disposed in the electronic device, and the connector socket electrically connected to a printed circuit board disposed in the electronic device. the connector plug may include a connection pin configured to electrically connect a first plug pin disposed at a first side thereof and a second plug pin disposed at a second side.

A connector structure according to various embodiments of the disclosure may include a connector plug electrically connected to a flexible circuit board disposed in the electronic device, and a connector socket electrically connected to a printed circuit board disposed in the electronic device. the connector plug may include multiple plug pins and at least one connection pin configured to directly connect at least some of the multiple plug pins.

A connector structure an electronic device including the same, according to various embodiments of the disclosure, may have a direct connection path formed on a connector plug of a flexible circuit board (for example, FRC (flexible printed circuit board type RF (radio frequency) cable)) such that, by replacing an RF switch, an electronic component mounting space of the electronic device can be secured.

A connector structure an electronic device including the same, according to various embodiments of the disclosure, may form a Sub6 (or UWB) path through electric fastening between a connector plug connected to an FRC and a connector socket disposed on a PCB.

A connector structure an electronic device including the same, according to various embodiments of the disclosure, may enable RF switching with regard to each frequency band without an RF switch for a Sub6 (or UWB) antenna.

Various other advantageous effects identified explicitly or implicitly through the disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates an antenna performance for each frequency band when a connector structure according to an embodiment of the disclosure is applied to an electronic device:

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
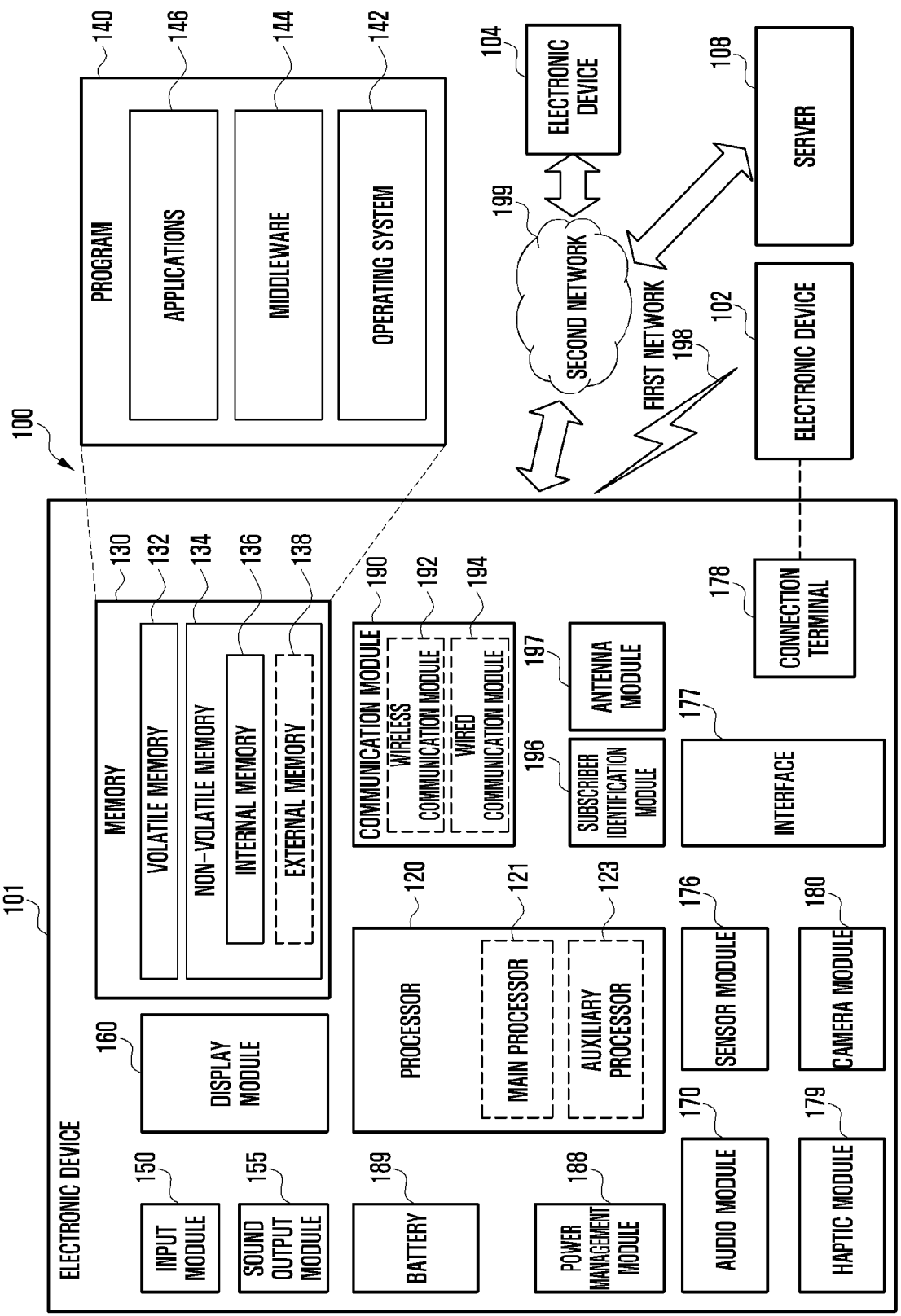
FIG. 1 illustrates a block diagram of an electronic device in a network environment according to various embodiments of the disclosure.

FIG. 1 illustrates a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, a display module 160 illustrated in FIG. 1 may include a display configured to be foldable or unfoldable. An electronic device including a display, when being folded, may have a flexible circuit board (e.g., a FRC cable) which can be folded or unfolded in a folding region in which the display is folded.

According to an embodiment, the display module 160 illustrated in FIG. 1 may include a display which is disposed to be slidable so as to provide a screen (e.g., a display screen).

For an example, a display region of an electronic device 101 may be a region visually exposed to enable output of image, and the electronic device 101 may be configured to adjust a display region according to a movement of a sliding plate (not shown) or a movement of a display. At least a part (e.g., a housing) of the electronic device 101 may operate to be slidable at least partially, and therefore a rollable-type electronic device, which is configured to promote a selective expansion of a display region, may be an example including the display module 160. For an example, the display module 160 may be referred to as a slide-out display or an expandable display.

Figure 2:
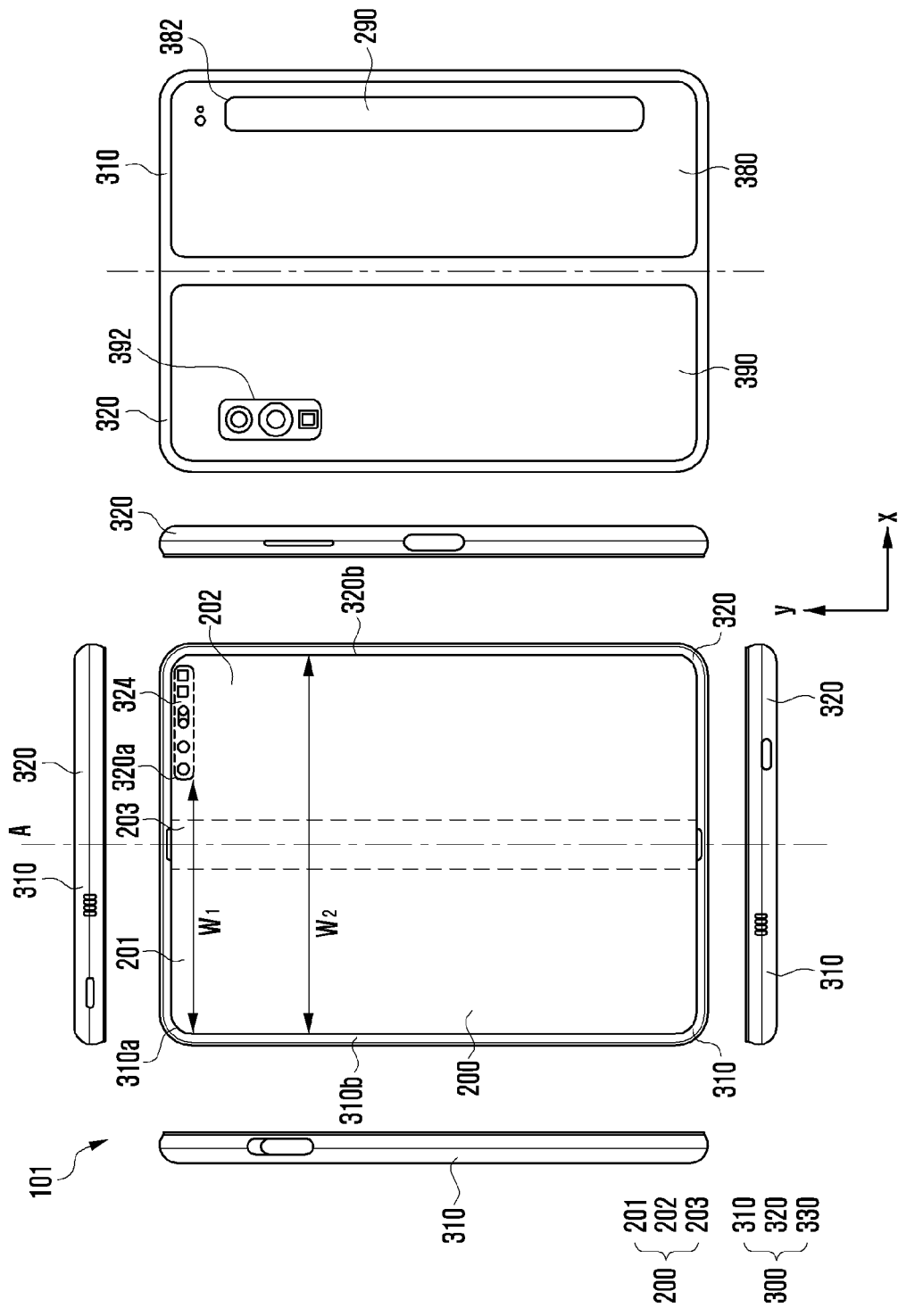
FIG. 2 illustrates an unfolded (open) state of an electronic device according to various embodiments of the disclosure.
Figure 3:
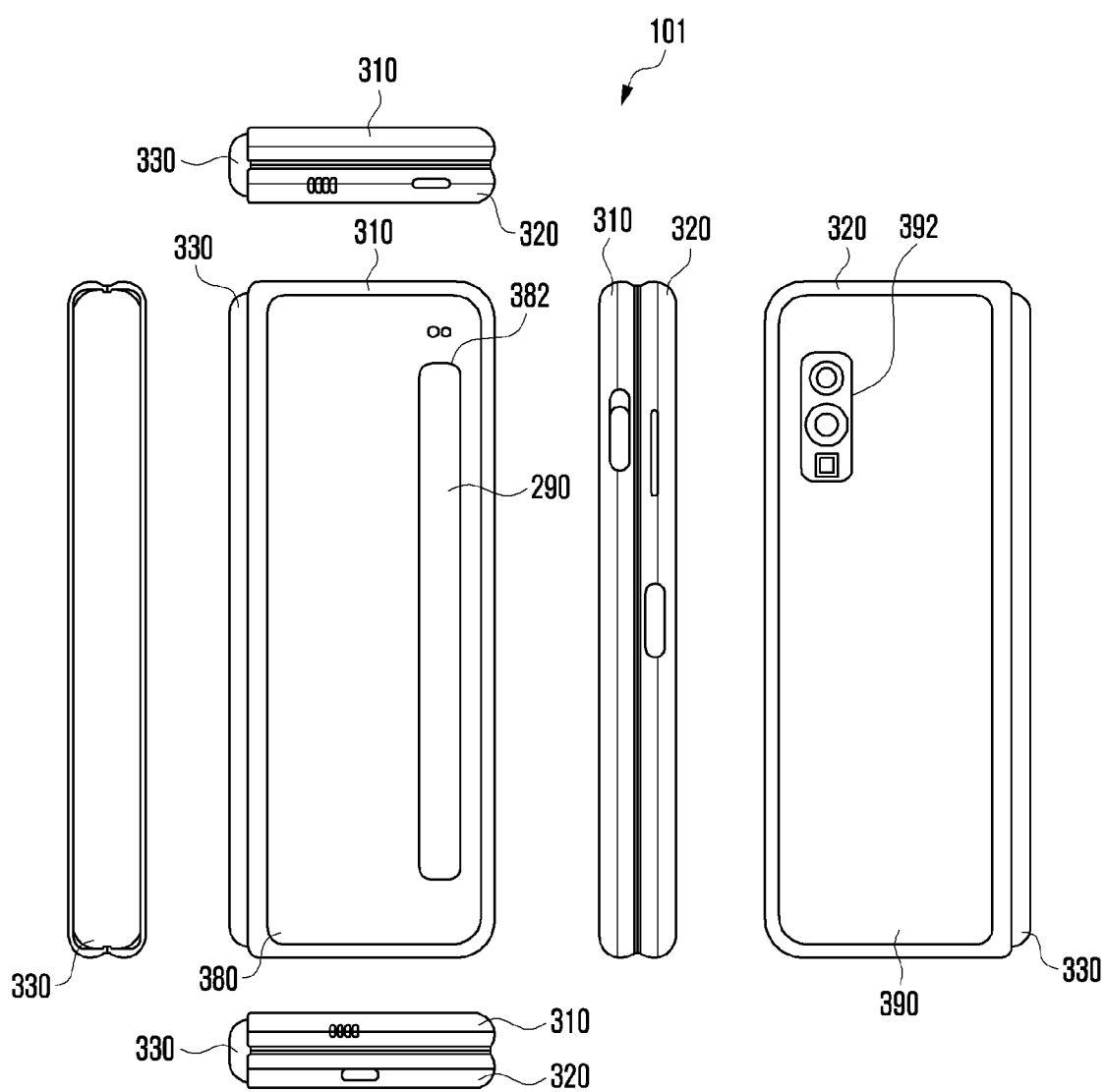
FIG. 3 illustrates a folded (closed) state of an electronic device according to various embodiments of the disclosure.

FIG. 2 illustrates an unfolded (open) state of an electronic device 101 according to various embodiments of the disclosure. FIG. 3 illustrates a folded (closed) state of an electronic device 101 according to various embodiments of the disclosure.

Referring to FIG. 2 and FIG. 3, the electronic device 101 may include a housing 300, a hinge cover 330 for covering a foldable portion of the housing 300, and a flexible or a foldable display 200 (hereinafter, shortly referred to as a "display" 200) disposed in a space formed by the housing 300. In the disclosure, a surface, on which the display 200 is disposed, may be defined as a first surface or a front surface of the electronic device 101. In addition, a surface opposite to the front surface may be defined as a second surface or a rear surface of the electronic device 101. In addition, a surface, which surrounds a space between the front surface and the rear surface, may be defined as a third surface or a side surface of the electronic device 101. For an example, the electronic device 101 may be folded or unfolded in the x-axis direction with reference to a folding region 203.

In an embodiment, the housing 300 may include a first housing structure 310, a second housing structure 320 including a sensor region 324, a first rear cover 380, and a second rear cover 390. The housing 300 of the electronic device 101 may not be limited to the shape illustrated in FIGS. 2 and 3 and a combination thereof, and may be implemented by a combination and/or coupling of other shape or components. For an example, in another embodiment, the first housing structure 310 and the first rear cover 380 may be integrally formed, and the second housing structure 320 and the second rear cover 390 may be integrally formed.

In the embodiment illustrated therein, the first housing structure 310 and the second housing structure 320 may be respectively arranged at both sides with reference to a folding axis A, and may have a generally symmetric shape with reference to the folding axis A. As described below, the angle formed by the first housing structure 310 and the second housing structure 320 or the distance between the first housing structure 310 and the second housing structure 320 may change according to whether the electronic device 101 is an unfolded state, a folded state, or an intermediate state. In the embodiment illustrated therein, the second housing structure 320 differently from the first housing structure 310 may further include the sensor region 324 in which various sensors are arranged, but the first housing structure and the second housing structure may have a shape symmetric to each other in a region other than the sensor region.

In an embodiment, the first housing structure 310 and the second housing structure 320 may together form a recess for receiving the display 200. According to the embodiment illustrated therein, due to the sensor region 324, the recess may have two or more widths different from each other in a direction vertical to the folding axis A.

For an example, the recess may have a first width W1 between a first portion 310a of the first housing structure 310 and a first portion 320a of the second housing structure 320, which is formed at an edge of the sensor region 324 of the second housing structure 320. The recess may have a second width W2 formed by a second portion 310b of the first housing structure 310, which is parallel to the folding axis A, in the first housing structure 310, and a second portion 320b of the second housing structure 320, which is not the sensor region 324 and parallel to the folding axis A, in the second housing structure 320. In the case, the second width W2 may be formed longer than the first width W1. In other words, the first portion 310a of the first housing structure 310 and the first portion 320a of the second housing structure 320, which have a shape asymmetric to each other, may form the first width W1 of the recess. The second portion 310b of the first housing structure 310 and the second portion 320b of the second housing structure 320, which have a shape symmetric to each other, may form the second width W2 of the recess. In an embodiment, the first portion 320a and the second portion 320b of the second housing structure 320 may have different distances from the folding axis A. The width of the recess may not be limited to the embodiment illustrated therein. In various embodiments, the recess may have multiple widths, for example, the shape of the sensor region 324 or the portion at which the first housing structure 310 and the second housing structure 320 have an asymmetric shape.

In an embodiment, at least a part of each of the first housing structure 310 and the second housing structure 320 may be made of a metal material or a nonmetal material having rigidity, the size of which is selected to support the display 200.

In an embodiment, the sensor region 324 may be formed to have a predetermined region adjacent to one corner of the second housing structure 320. However, the arrangement, shape, and size of the sensor region 324 may not be limited to the embodiment illustrated therein. For an example, in another embodiment, the sensor region 324 may be provided in other corner, or a random region between the upper end corner and the lower end corner of the second housing structure 320. In an embodiment, components for performing various functions embedded in the electronic device 101 may be exposed from the front surface of the electronic device 101 through the sensor region 324 or through at least one opening provided through the sensor region 324. In various embodiments, the components may include various types of sensors. For an example, the sensors may include a front camera, a receiver, or a proximity sensor.

The first rear cover 380 may be disposed at one side of the folding axis A on the rear surface of the electronic device. For an example, the first rear cover may have a periphery substantially in a rectangular shape, and may be surrounded by the first housing structure 310. Similarly, the second rear cover 390 may be disposed at the other side of the folding axis A on the rear surface of the electronic device, and the periphery thereof may be surrounded by the second housing structure 320.

In the embodiment illustrated therein, the first rear cover 380 and the second rear cover 390 may have a substantially symmetric shape with reference to the folding axis A. However, it is not that the first rear cover 380 and the second rear cover 390 should have a shape symmetric to each other, and in another embodiment, the electronic device 101 may include the first rear cover 380 and the second rear cover 390 having various shapes. In another embodiment, the first rear cover 380 may be integrally formed with the first housing structure 310, and the second rear cover 390 may be integrally formed with the second housing structure 320.

In an embodiment, the first rear cover 380, the second rear cover 390, the first housing structure 310, and the second housing structure 320 may form a space in which various components (e.g., a printed circuit board or a battery) of the electronic device 101 can be arranged. In an embodiment, one or more components may be disposed on the rear surface of the electronic device 101, or may be visually exposed therefrom. For an example, at least a part of a sub-display 290 may be visually exposed through a first rear region 382 of the first rear cover 380. In another embodiment, one or more components or sensors may be visually exposed through a second rear region 392 of the second rear cover 390. In various embodiments, the sensors may include a proximity sensor, a fingerprint sensor, and/or a rear camera.

The hinge cover 330 may be disposed between the first housing structure 310 and the second housing structure 320, and may be configured to hide an internal component (e.g., a hinge structure). In an embodiment, the hinge cover 330 may be hidden or exposed to the outside, by a part of the first housing structure 310 and the second housing structure 320 according to a state (an unfolded state (a flat state) or a folded state) of the electronic device 101.

For an example, as illustrated in FIG. 2, when the electronic device 101 is unfolded, the hinge cover 330 may be hidden by the first housing structure 310 and the second housing structure 320, and thus may not be exposed. For an example, as illustrated in FIG. 3, when the electronic device 101 is folded (e.g., a fully folded state), the hinge cover 330 may be exposed to the outside through between the first housing structure 310 and the second housing structure 320. For an example, when the electronic device 101 is in an intermediate state in which the first housing structure 310 and the second housing structure 320 are folded with a certain angle, a part of the hinge cover 330 may be exposed to the outside through between the first housing structure 310 and second housing structure 320. However, in the case, the exposed region may be smaller than that of the fully folded state. In an embodiment, the hinge cover 330 may include a curved-surface.

The display 200 may be disposed on a space formed by the housing 300. For an example, the display 200 may be stably seated on a recess formed by the housing 300, and may constitute most of the front surface of the electronic device 101.

Accordingly, the front surface of the electronic device 101 may include the display 200, and a partial region of the first housing structure 310 and a partial region of the second housing structure 320, which are adjacent to the display 200. In addition, the rear surface of the electronic device 101 may include the first rear cover 380, a partial region of the first housing structure 310, which is adjacent to the first rear cover 380, the second rear cover 390, and a partial region of the second housing structure 320, which is adjacent to the second rear cover 390.

The display 200 may mean a display, a partial region of which can be transformed into a flat-surface or a curved-surface. In an embodiment, the display 200 may include a folding region 203, a first region 201 disposed at one side (the left direction (e.g., the −x-axis direction) of the folding region 203 illustrated in FIG. 2) with reference to the folding region 203, and a second region 202 disposed at the other side (e.g., the right direction (e.g., the x-axis direction) of the folding region 203 illustrated in FIG. 2). The display 200 may include a polarizing film (or a polarizing layer), a window glass (e.g., an ultra-thin glass (UTG) or a polymer window), and an optical compensation film (OCF).

The segmentation of regions of the display 200 may be merely an example, and the display 200 may be segmented into multiple regions (e.g., four or more, or two) according to the structure or function thereof. For an example, in the embodiment illustrated in FIG. 2, regions of the display 200 may be segmented by the folding region 203 extending in parallel to the y-axis or by the folding axis A, but in another embodiment, regions of the display 200 may be segmented with reference to other folding region (e.g., a folding region parallel to the x-axis), or other folding axis (e.g., a folding axis parallel to the x-axis).

The first region 201 and the second region 202 may have a generally symmetric shape with reference to the folding region 203. The second region 202 differently from the first region 201 may include a notch which is cut according to the existence of the sensor region 324, but in a region other than the sensor region 324, the second region may have a shape symmetric with the first region 201. In other words, the first region 201 and the second region 202 may include a portion having a shape symmetric to each other, and a portion having a shape asymmetric to each other.

Hereinafter, an operation of the first housing structure 310 and the second housing structure 320 and each region of the display 200, according to a state (e.g., an unfolded state (a flat state) and a folded state) of the electronic device 101, will be described.

In an embodiment, when the electronic device 101 is an unfolded state (a flat state) (e.g., FIG. 2), the first housing structure 310 and the second housing structure 320 may form about 180 degrees and may be arranged to face the same direction. The surface of the first region 201 and the surface of the second region 202 of the display 200 may form about 180 degrees each other, and may face the same direction (e.g., the front surface direction of the electronic device). The folding region 203 may form a same flat surface together with the first region 201 and the second region 202.

In an embodiment, when the electronic device 101 is a folded state (e.g., FIG. 3), the first housing structure 310 and the second housing structure 320 may be arranged to face each other. The surface of the first region 201 and the surface of the second region 202 of the display 200 may form a narrow angle (e.g., zero to ten degrees), and may face each other. The folding region 203 may have at least a part formed as a curved-surface having a predetermined curvature.

In an embodiment, when the electronic device 101 is an intermediate state (a half folded state), the first housing structure 310 and the second housing structure 320 may be arranged with a certain angle.

Figure 4:
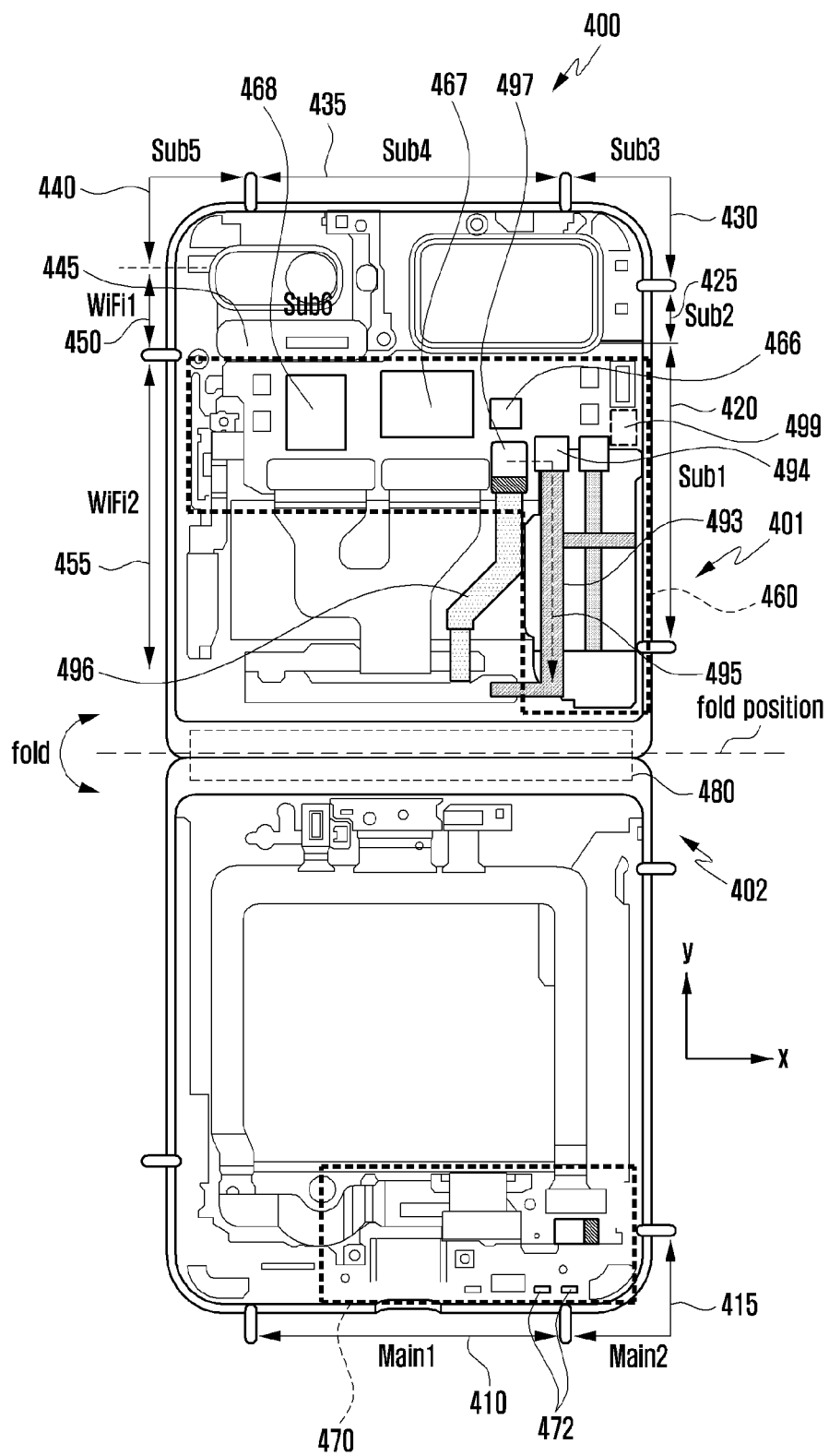
FIG. 4 illustrates an electronic device according to various embodiments of the disclosure.

FIG. 4 illustrates an electronic device 400 according to various embodiments of the disclosure.

Referring to FIG. 4, an electronic device 400 according to various embodiments of the disclosure may include a hinge structure 480 disposed at a fold position. For an example, the electronic device 400 may be folded or unfolded in a vertical direction (e.g., the y-axis direction) with reference to the fold position by using the hinge structure 480. When the electronic device 400 is folded, a first portion 401 and a second portion 402 of the electronic device 400 may approach while facing each other with reference the fold position.

According to an embodiment, the electronic device 400 may include a first circuit board 460 disposed at the first portion 401, a second circuit board 470 disposed at the second portion 402, multiple antenna modules, and flexible circuit boards 493 and 496 (e.g., a flexible printed circuit board type RF cable (FRC)).

According to an embodiment, a modem 466, multiple front end modules 467, and a transceiver 468 may be arranged on the first circuit board 460. A first connector structure 494 for electrically connecting a first flexible circuit board 493 (e.g., a first FRC cable) to the first circuit board 460, and a second connector structure 497 for electrically connecting a second flexible circuit board 496 (e.g., a second FRC cable) to the first circuit board 460 may be connected to the first circuit board 460.

According to an embodiment, an antenna feeder 472 connected to at least one antenna module may be arranged on the second circuit board 470.

According to an embodiment, the first circuit board 460 of the first portion 401 and the second circuit board 470 of the second portion 402 of the electronic device 400 may be electrically connected through a flexible circuit board.

As an embodiment, the electronic device 400 may include the first flexible circuit board 493 (e.g., a first flexible printed circuit board type RF cable (FRC cable)) for transmitting a mmWave RF signal of the multiple antenna modules, and the second flexible circuit board 496 (e.g., a second FRC cable) for transmitting an RF signal of a sub-antenna module (e.g., a sub6 antenna module) of the multiple antenna modules.

As an embodiment, a connector plug (e.g., the connector plug 700 of FIG. 7) of the first connector structure 494 for connecting the first flexible circuit board 493 (e.g., a first FRC cable) and the first circuit board 460 may be connected to the first flexible circuit board 493 (e.g., a first FRC cable). A connector socket (e.g., the connector socket 800 of FIG. 8) of the first connector structure 494 may be disposed on the first circuit board 460.

As an embodiment, a connector plug (e.g., the connector plug 700 of FIG. 7) of the second connector structure 497 for connecting the second flexible circuit board 496 (e.g., a second FRC cable) and the first circuit board 460 may be connected to the second flexible circuit board 496 (e.g., a second FRC cable). A connector socket (e.g., the connector socket 800 of FIG. 8) of the second connector structure 497 may be disposed on the first circuit board 460.

As an embodiment, the first flexible circuit board 493 (e.g., a first FRC cable) may be electrically connected to the first circuit board 460 through the first connector structure 494. The second flexible circuit board 496 (e.g., a second FRC cable) may be electrically connected to the first circuit board 460 through the second connector structure 497.

According to an embodiment, the multiple antenna modules may include a first antenna module 410 (a first main antenna module), a second antenna module 415 (a second main antenna module), a third antenna module 420 (a sub-1 antenna module), a fourth antenna module 425 (e.g., a sub-2 antenna module), a fifth antenna module 430 (e.g., a sub-3 antenna module), a sixth antenna module 435 (e.g., a sub-4 antenna module), a seventh antenna module 440 (e.g., a sub-5 antenna module), an eighth antenna module 445 (e.g., a sub6 antenna module), a first WiFi antenna module 450, and a second WiFi antenna module 455.

According to an embodiment, the WiFi module is exemplified as a WiFi circuit for supporting WiFi communication, but may not be limited thereto. For an example, a Bluetooth circuit for supporting Bluetooth communication may be included therein. The electronic device 400 according to various embodiments of the disclosure may form a path 495 for transmitting/receiving a first signal in a UWB frequency band through a pin connection between a connector plug (e.g., the connector plug 700 of FIG. 7) connected to the first flexible circuit board 493 (e.g., a first FRC) and a connector socket (e.g., the connector socket 800 of FIG. 8) connected to the first circuit board 460.

Figure 5:
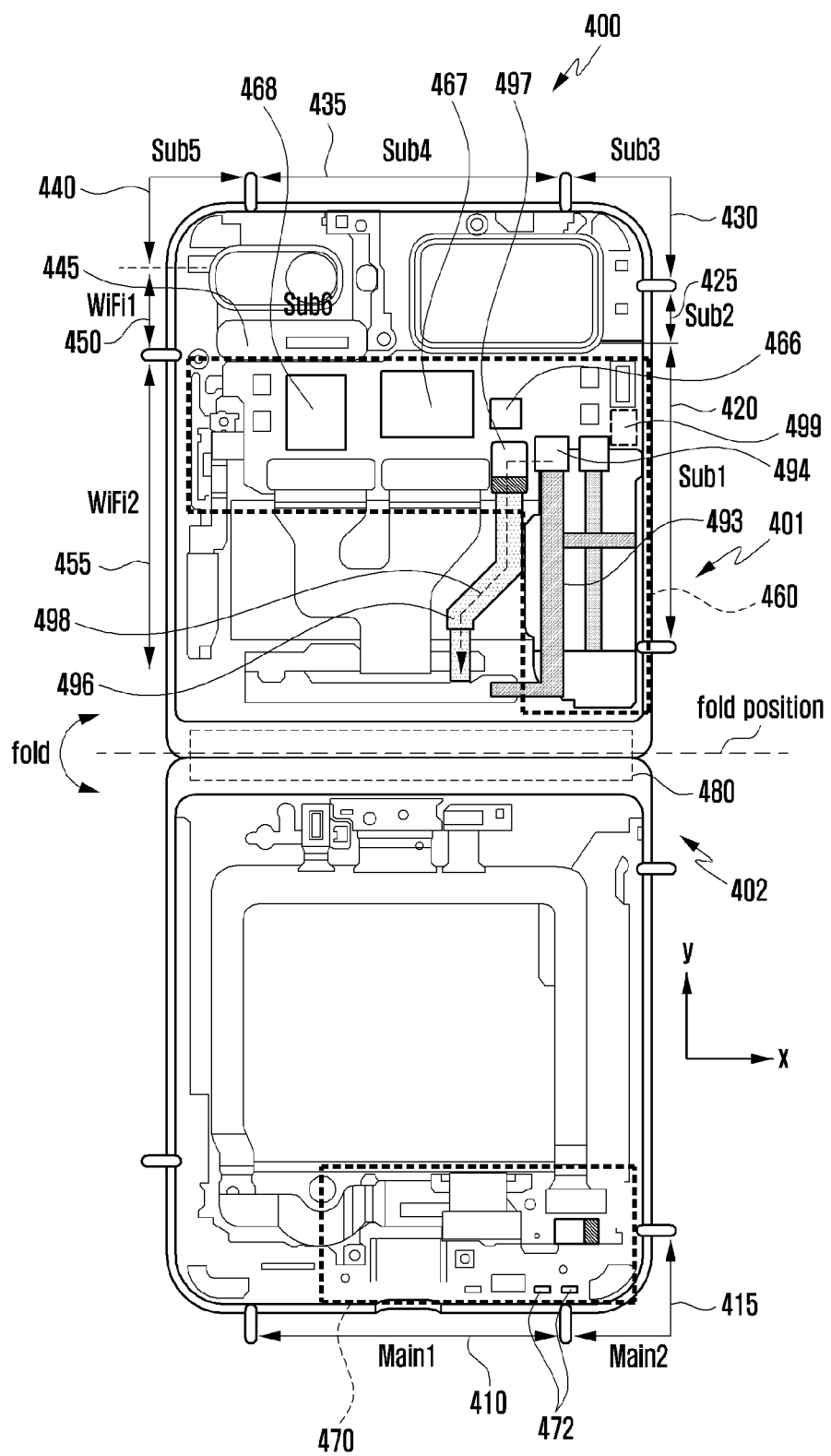
FIG. 5 illustrates an electronic device according to various embodiments of the disclosure.

FIG. 5 illustrates an electronic device according to various embodiments of the disclosure. In the description of an electronic device 400 of FIG. 5, the detailed description for configurations, which are substantially the same as the electronic device 400 of FIG. 4, may be omitted.

Referring to FIG. 5, a path 498 for transmitting/receiving a second signal in a Sub6 frequency band may be formed through a pin connection between a connector plug (e.g., the connector plug 700 of FIG. 7) connected to the second flexible circuit board 496 (e.g., a second FRC cable) and a connector socket (e.g., the connector socket 800 of FIG. 8) connected to the first circuit board 460.

The electronic device 400 according to various embodiments of the disclosure may form a path 495 of a first signal in a UWB frequency band or the path 498 for transmitting/receiving a second signal in the Sub6 frequency band through a connector structure even without a Sub6 RF switch 499 for an RF switch in a Sub6 frequency band.

Figure 6:
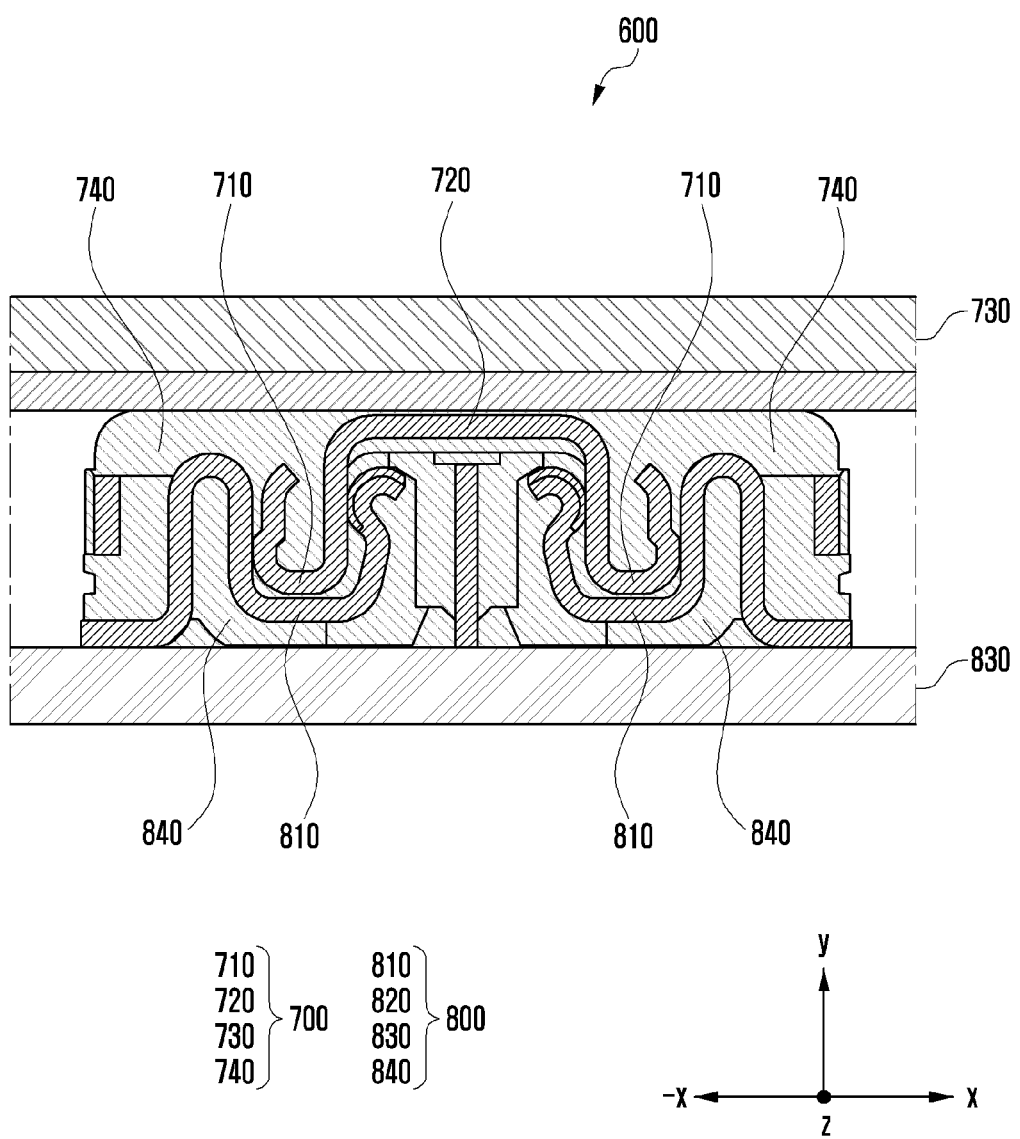
FIG. 6 illustrates a connector structure according to various embodiments of the disclosure.
Figure 7:
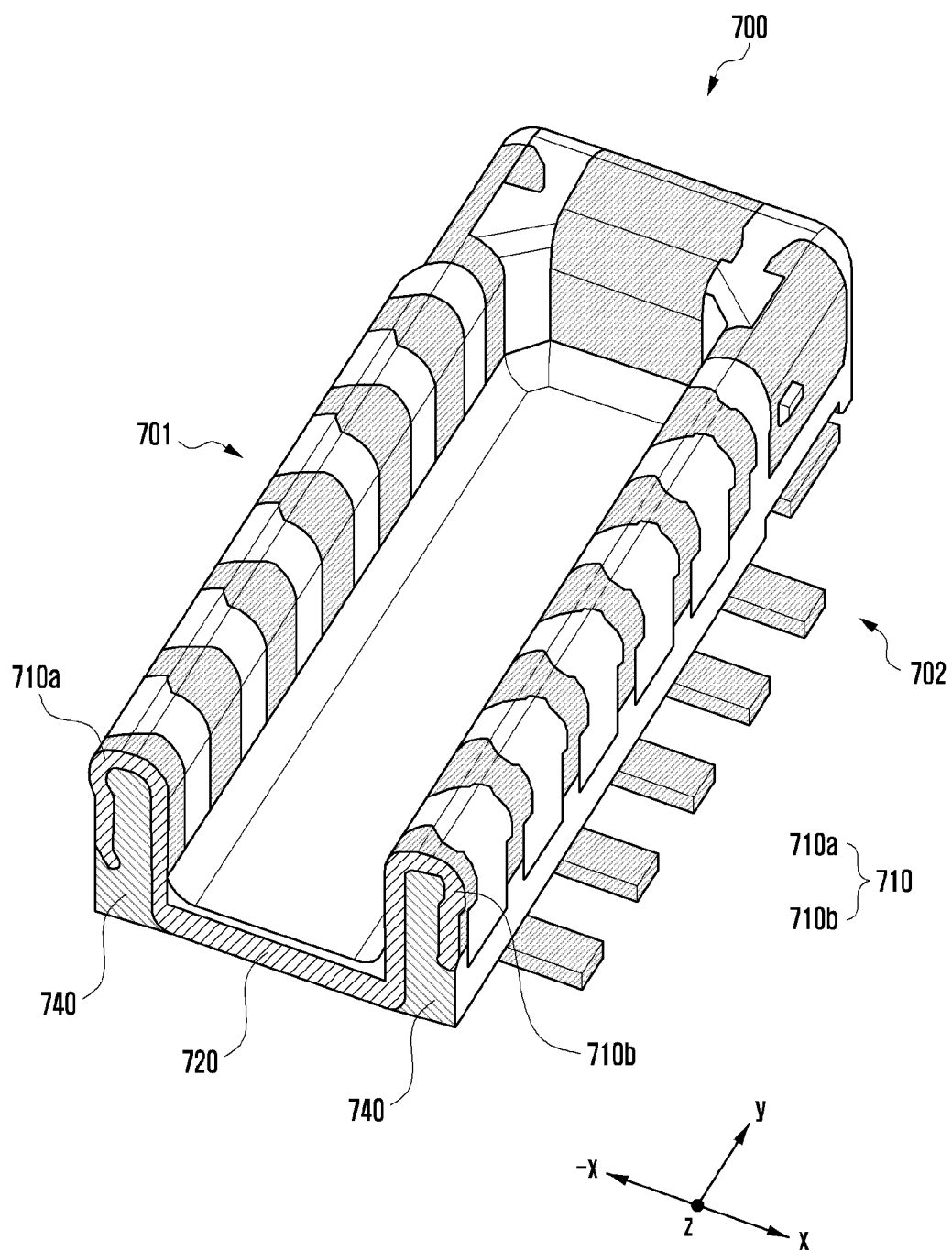
FIG. 7 illustrates a connector plug of the connector structure illustrated in FIG. 6.
Figure 8:
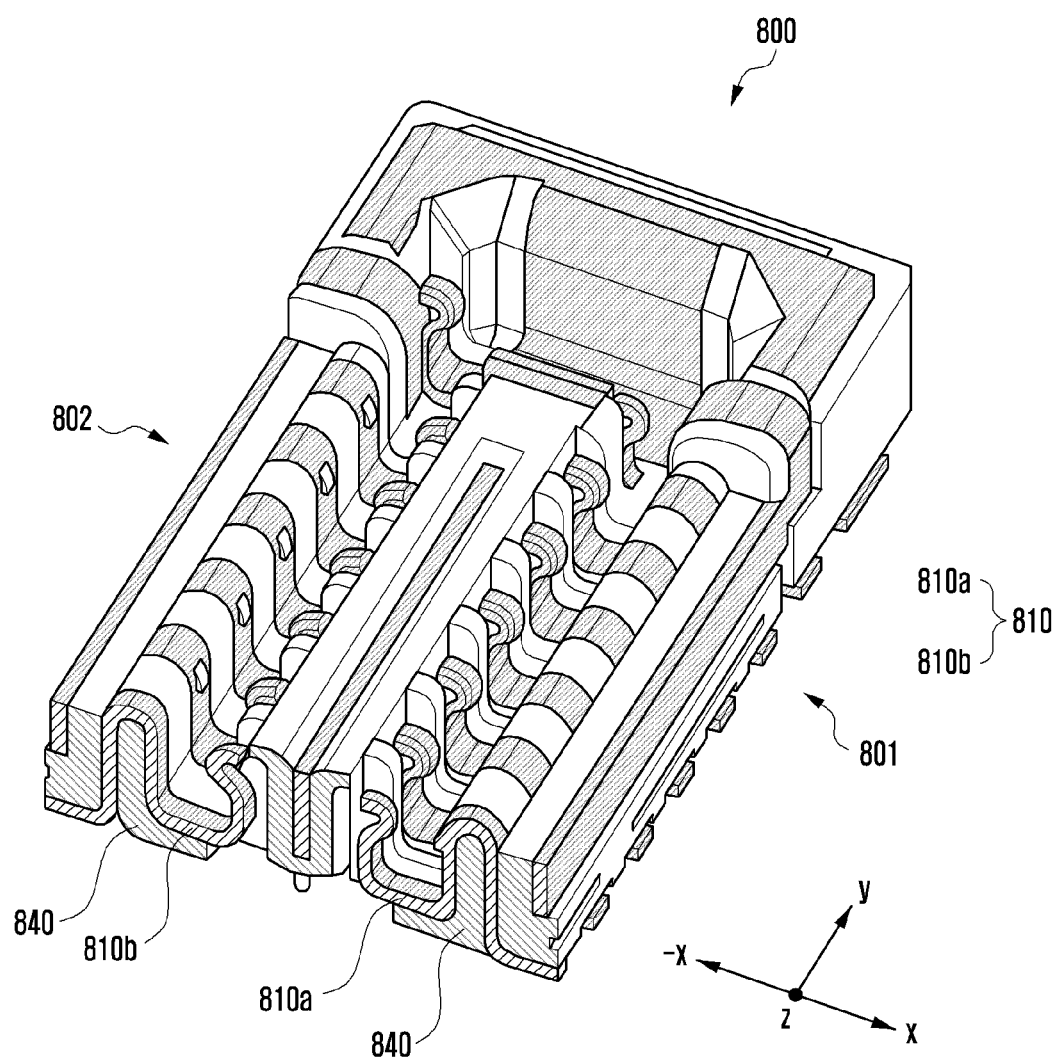
FIG. 8 illustrates a connector socket of the connector structure illustrated in FIG. 6.

FIG. 6. illustrates a connector structure 600 according to various embodiments of the disclosure. FIG. 7 illustrates a connector plug 700 of the connector structure 600 illustrated in FIG. 6. FIG. 8 illustrates a connector socket 800 of the connector structure 600 illustrated in FIG. 6.

Referring to FIG. 6 to FIG. 8, a connector structure 600 according to various embodiments of the disclosure may include a connector plug 700 and a connector socket 800. The connector plug 700 may be disposed at both sides of a flexible circuit board (e.g., the first flexible circuit board 493 and the second flexible circuit board 496 (e.g., a second FRC cable) of FIG. 4 and FIG. 5), and may be electrically connected to a wire 730 of the flexible circuit board. The connector socket 800 may be disposed on a first PCB (e.g., the first PCB 930 (e.g., the first circuit board 460 (e.g., a main PCB) of FIG. 4 and FIG. 5) of FIG. 9), and may be electrically connected to the first PCB (e.g., the first PCB 930 (e.g., the first circuit board 460 (e.g., a main PCB) of FIG. 4 and FIG. 5) of FIG. 9).

As an embodiment, the connector plug 700 may include multiple plug pins 710. Apart of the multiple plug pins 710 may be electrically connected to a signal wire. A part of the multiple plug pins 710 may be electrically connected to a ground wire. Each of the multiple plug pins 710 may include a first plug pin 710a disposed at a first side 701 and a second plug pin 710b disposed at a second side 702. Each of the multiple plug pins 710 of the connector plug 700 may include at least one connection pin 720 (e.g., a bridge) configured to electrically connect the first plug pin 710a disposed at the first side 701 and the second plug pin 710b disposed at the second side 702.

As an embodiment, the connector socket 800 may include multiple socket pins 810. A part of the multiple socket pins 810 may be electrically connected to a signal wire. A part of the multiple socket pins 810 may be electrically connected to a ground wire. The multiple socket pins 810 each may include a first socket pin 810a disposed at a first side 801 and a second socket pin 810b disposed at a second side 802.

As an embodiment, each of the multiple plug pins 710 of the connector plug 700 may be electrically insulated by a first insulating layer 740. Each of the multiple socket pins 810 of the connector socket 800 may be electrically insulated by a second insulating layer 840.

As an embodiment, each of the multiple plug pins 710 of the connector plug 700 may exposed to the outside. Each of the multiple socket pins 810 of the connector socket 800 may exposed to the outside. The second insulating layer 840 may be formed to cover the connection pin 720 of the connector plug 700 so that the connection pin 720 of the connector plug 700 is not exposed to the outside.

As an embodiment, the connector plug 700 and the connector socket 800 may be arranged to face each other, and the connector plug 700 may be inserted in the connector socket 800 to be fastened thereto. The multiple plug pins 710 of the connector plug 700 may be electrically connected to the multiple socket pins 810 of the connector socket 800, respectively.

A general electronic device has an RF switch disposed therein in accordance with transmission path (Tx path) switching of a 5G Sub6 antenna. In addition, when a UWB communication circuit is mounted in a chip on board (CoB) type, an RF switch for a line calibration is disposed therein.

The connector structure 600 according to various embodiments of the disclosure may have the connection pin 720 configured to directly connect the first plug pin 710a disposed at the first side 701 and the second plug pin 710b disposed at the second side 702 of the connector plug 700 of a flexible circuit board (e.g., a flexible printed circuit board type radio frequency (RF) cable (FRC)). An electronic device including the connector structure 600 according to an embodiment of the disclosure may have a transmission path (a Tx path) of a Sub6 or UWB formed therein without an RF switch (e.g., a Sub6 RF switch, an ultra-wide band (UWB) RF switch). In addition, an electronic device including the connector structure 600 according to an embodiment of the disclosure may enable RF switching for each frequency band to be performed even without a Sub6 RF switch or a UWB RF switch, and may enable a line calibration to be performed even without an RF switch.

Figure 9:
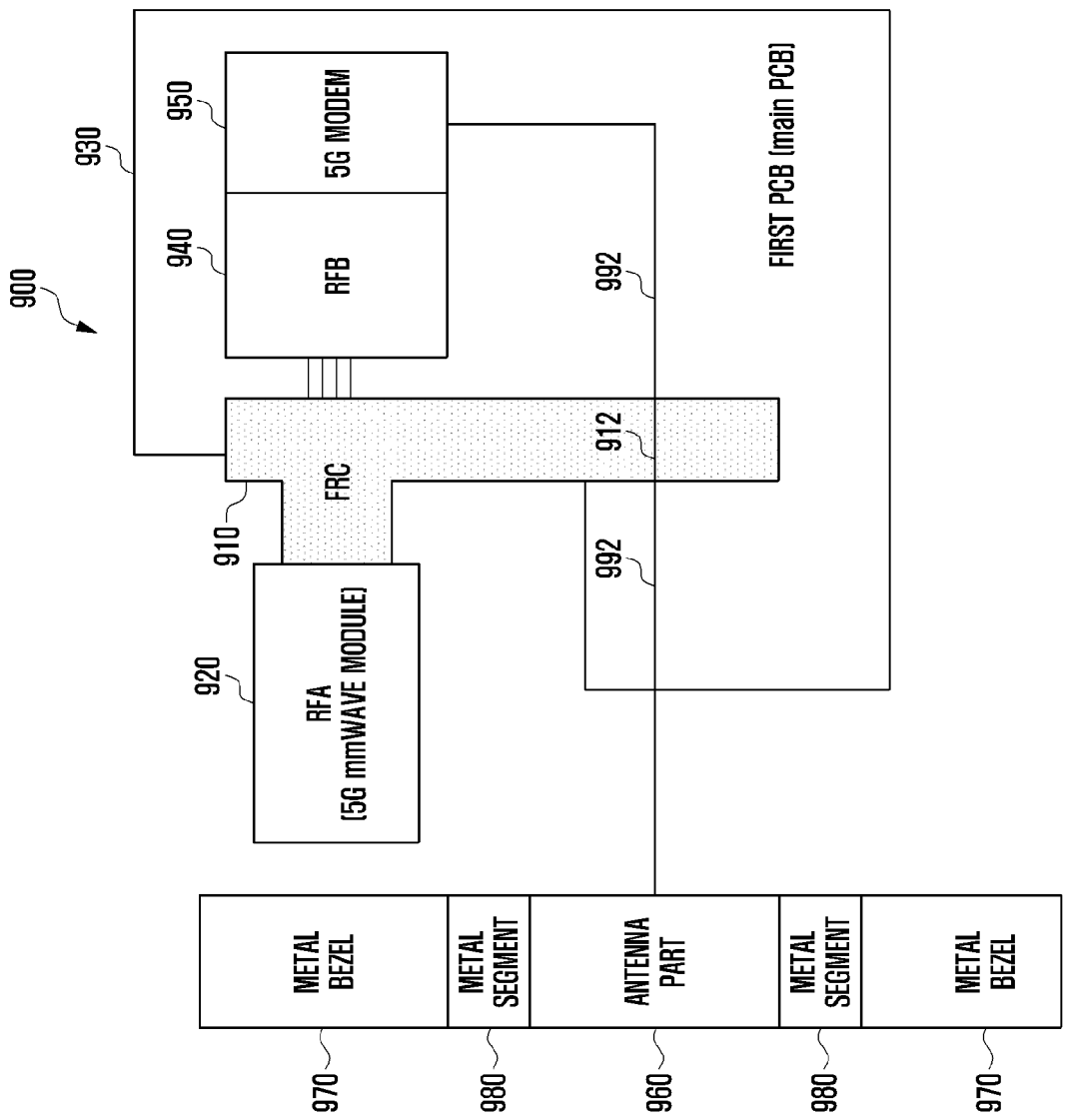
FIG. 9 illustrates an electronic device according to an embodiment of the disclosure, and is a block diagram illustrating an RFA and an RFB connected to each other by using a flexible circuit board, and an RF modem and a sub6 antenna part connected to each other.
Figure 10:
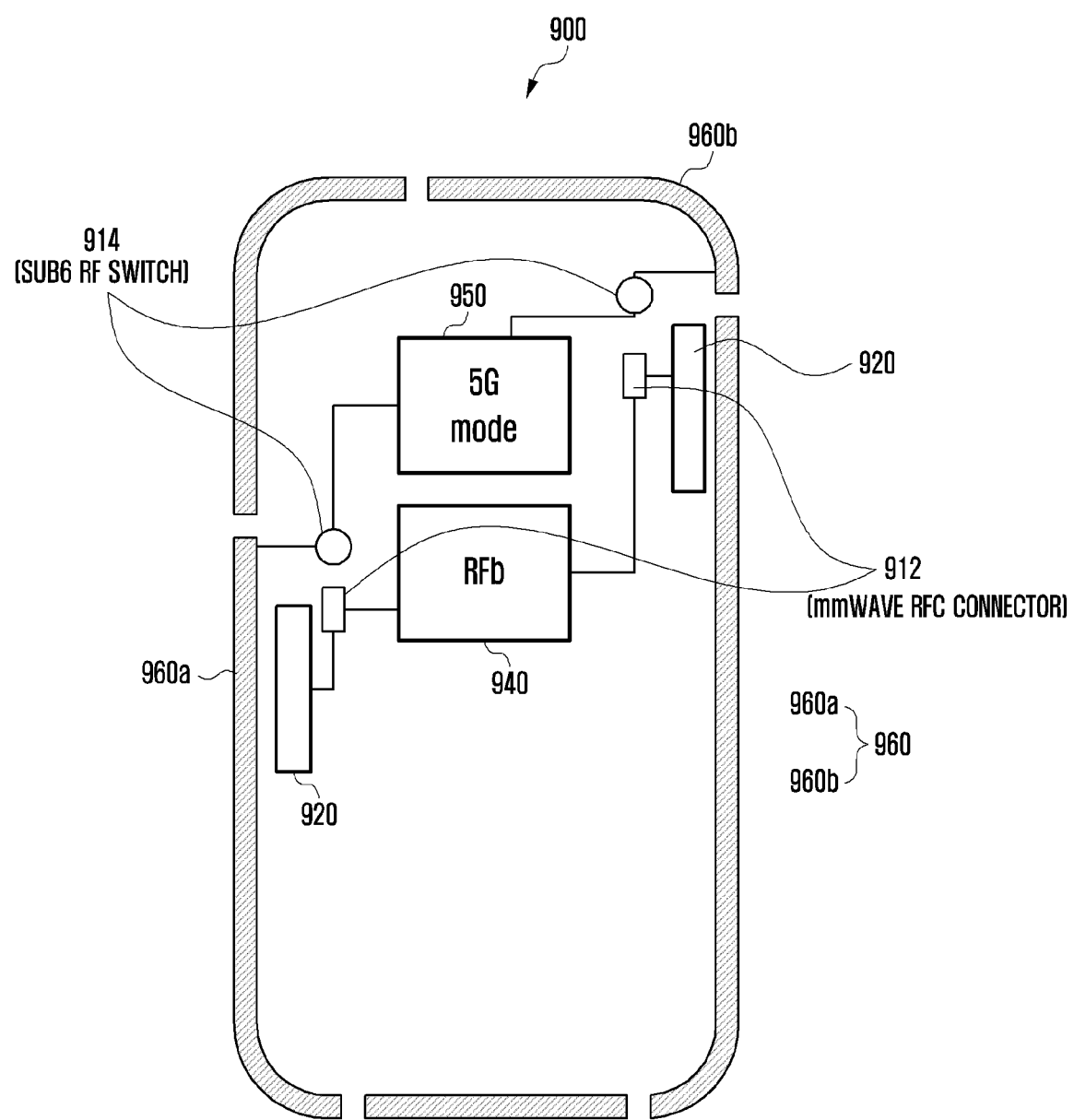
FIG. 10 illustrates sub6 RF switching performed using a mmWave RFC connector of an electronic device according to an embodiment of the disclosure.

FIG. 9 illustrates an electronic device 900 according to an embodiment of the disclosure, and is a block diagram illustrating a radio frequency detection circuit A (RFA) 920 and radio frequency detection circuit B (RFB) 940 connected to each other by using a flexible circuit board 910 (e.g., a FRC cable), and an RF modem 950 and a Sub6 antenna part 960 connected to each other. FIG. 10 illustrates Sub6 RF switching performed using a mmWave radio frequency common (RFC) connector of an electronic device according to an embodiment of the disclosure.

Referring to FIG. 9 and FIG. 10, an electronic device 900 according to an embodiment of the disclosure may include a flexible circuit board 910 (e.g., a FRC cable), an RFA 920 (e.g., a 5G mmWave module), a first PCB 930 (e.g., a main PCB) (e.g., the first circuit board 460 of FIG. 4 and FIG. 5), an RFB 940, a 5G modem 950 (e.g., an RF modem), an antenna part 960 (e.g., a Sub6 antenna part and/or a UWB antenna), a metal bezel 970, and a metal segment 980. As an embodiment, the RFB 940 and the 5G modem 950 (e.g., an RF modem) may be arranged on the first PCB 930 (e.g., a main PCB) (e.g., the first circuit board 460 of FIG. 4 and FIG. 5). As an embodiment, the first PCB 930 (e.g., a main PCB) (e.g., the first circuit board 460 of FIG. 4 and FIG. 5) may include a communication processor CP (e.g., the processor 120 of FIG. 1). As an embodiment, the RFA 920 may be a first frequency signal processing module for processing a high-frequency signal. The RFB 940 may be a second frequency signal processing module for processing an intermediate-frequency signal.

According to an embodiment, the flexible circuit board 910 (e.g., a FRC cable) (e.g., the first flexible circuit board 493 (e.g., a first FRC cable) and the second flexible circuit board 496 (e.g., a first FRC cable) of FIG. 4 and FIG. 5) may be configured to electrically connect the RFA 920 (e.g., a 5G mmWave module) and the RFB 940. In addition, the flexible circuit board 910 (e.g., a FRC cable) (e.g., the first flexible circuit board 493 (e.g., a first FRC cable) and the second flexible circuit board 496 (e.g., a first FRC cable) of FIG. 4 and FIG. 5) may be configured to electrically connect the 5G modem 950 (e.g., an RF modem) and the antenna part 960 (e.g., a Sub6 antenna part and/or a UWB antenna part). The antenna part 960 may include a first antenna 960a for transmitting or receiving a wireless signal in a first frequency band and a second antenna 960b for transmitting or receiving a wireless signal in a second frequency band.

According to an embodiment, the flexible circuit board 910 (e.g., a FRC cable) (e.g., the first flexible circuit board 493 (e.g., a first FRC cable) and the second flexible circuit board 496 (e.g., a first FRC cable) of FIG. 4 and FIG. 5) may include a connector plug (e.g., the connector plug 700 of FIG. 7). A connector plug 912 (e.g., the connector plug 700 of FIG. 7) of the flexible circuit board 910 (e.g., a FRC cable) may include a connection pin (e.g., the connection pin 720 of FIG. 6 and FIG. 7) configured to directly connect a first plug pin (e.g., the first plug pin 710a of FIG. 7) and a second plug pin (e.g., the second plug pin 710b of FIG. 7). The first plug pin (e.g., the first plug pin 710a of FIG. 7) and the second plug pin (e.g., the second plug pin 710b of FIG. 7) may be directly connected through a connection pin (e.g., the connection pin 720 of FIG. 6 and FIG. 7) of the connector plug 912 (e.g., the connector plug 700 of FIG. 7). As an embodiment, a transmission/reception path 992 may be formed between the 5G modem 950 and the antenna part 960 (e.g., a Sub6 antenna part and/or a UWB antenna part) by the connection pin (e.g., the connection pin 720 of FIG. 6 and FIG. 7).

According to an embodiment, the function of an RF switch 914 (e.g., a Sub6 RF switch) may be performed through a connection pin (e.g., the connection pin 720 of FIG. 6 and FIG. 7) of the connector plug 912 (e.g., the connector plug 700 of FIG. 7), and thus a transmission path 992 (a Tx path) may be formed between the 5G modem 950 and the antenna part 960 (e.g., a Sub6 antenna part and/or a UWB antenna part).

According to an embodiment, the 5G modem 950 (e.g., an RF modem) may establish a wired or a wireless communication channel between the electronic device 900 and an external electronic device, and may deliver a signal (or a signal generated in a processor) for supporting a communication performance through the established communication channel to the RFB 940.

According to an embodiment, the RFB 940 may modulate a signal received in the 5G modem 950 (e.g., an RF modem) into an intermediate-frequency (IF) signal, and may deliver the modulated signal to the RFA 920 (e.g., a 5G mmWave module).

According to an embodiment, the RFA 920 (e.g., a 5G mmWave module) may receive a signal of a wireless frequency band, which has modulated in the RFB 940, to amplify same into a mmWave signal and/or to perform a wireless signal process. After that, the wireless signal, which has been processed in the RFA 920 (e.g., a 5G mmWave module), may be transmitted to a wireless space through each antenna array (e.g., a Sub6 antenna part and/or a UWB antenna part).

According to an embodiment, the electronic device 900 may perform a wireless communication with other electronic device by using a first wireless communication path configured to enable a wireless communication in a frequency band of 20 GHz or more.

According to an embodiment, the electronic device 900 may perform a wireless communication with other electronic device by using a second wireless communication path configured to enable a wireless communication in a frequency band of 12 GHz or less.

According to various embodiments, a first wireless communication path of the electronic device 900 may include the RFA 920, the flexible circuit board 910, the RFB 940, and the 5G modem 950.

According to various embodiments, a second wireless communication path of the electronic device 900 may include the antenna part 960 and the flexible circuit board 910.

According to an embodiment, the flexible circuit board 910 and the first PCB 930 may be electrically connected by a connector plug (e.g., the connector plug 700 of FIG. 7) electrically connected to the flexible circuit board 910 and a connector socket (e.g., the connector socket 800 of FIG. 8) electrically connected to the first PCB 930. The first wireless communication path may be formed between the flexible circuit board 910 and the first PCB 930 through a connector plug (e.g., the connector plug 700 of FIG. 7) and a connector socket (e.g., the connector socket 800 of FIG. 8) of a connector structure (e.g., the connector structure 600 of FIG. 6).

According to an embodiment, the communication processor CP disposed on the first PCB 930, and the antenna part 960 may be electrically connected by a connector plug (e.g., the connector plug 700 of FIG. 7) electrically connected to the flexible circuit board 910 and a connector socket (e.g., the connector socket 800 of FIG. 8) electrically connected to the first PCB 930. The second wireless communication path may be formed between the first PCB 930 and the antenna part 960 through a connector plug (e.g., the connector plug 700 of FIG. 7) and a connector socket (e.g., the connector socket 800 of FIG. 8) of a connector structure (e.g., the connector structure 600 of FIG. 6).

Figure 11:
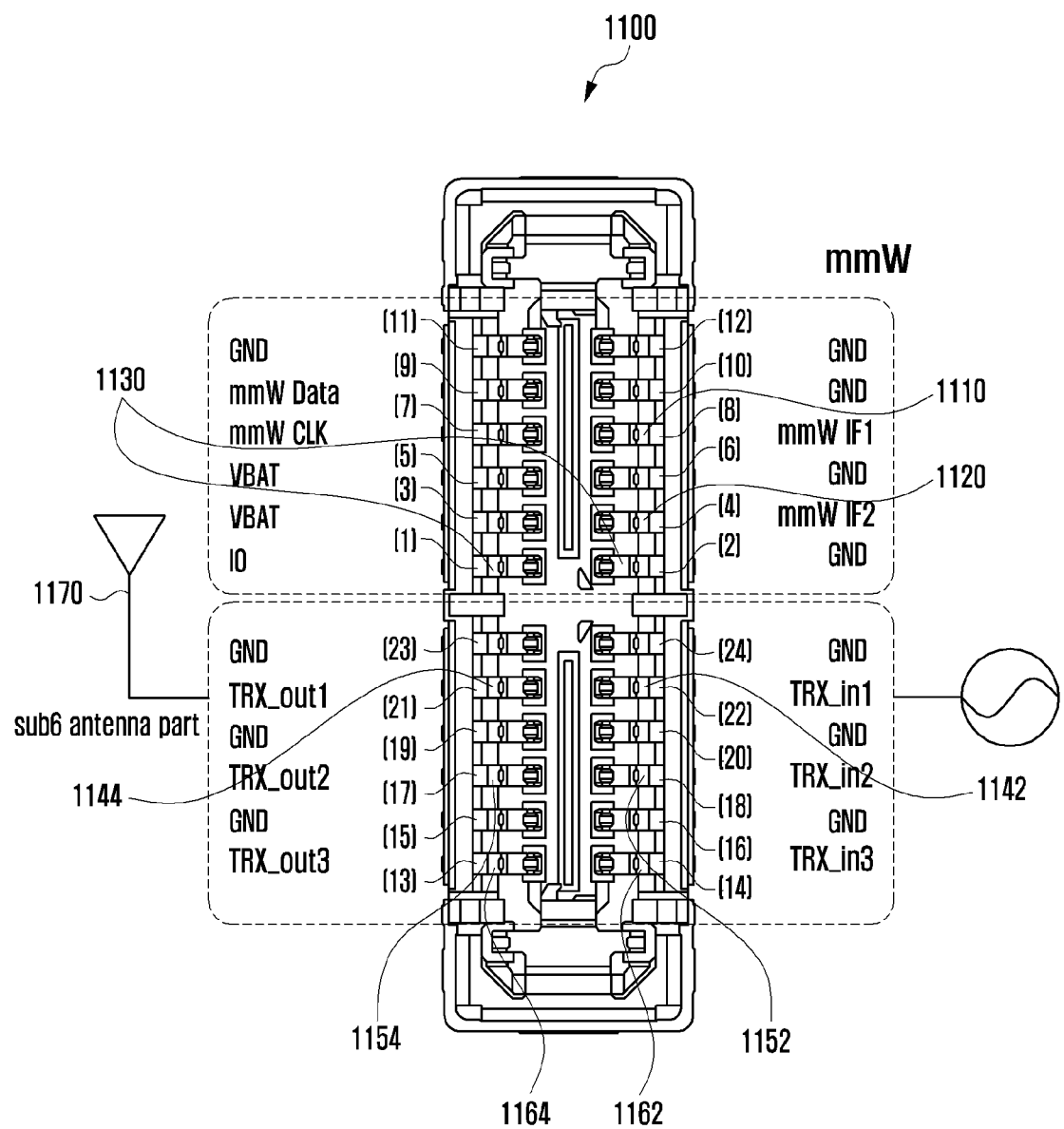
FIG. 11 illustrates a connector socket of a connector structure when multiple sub6 transmission paths are simultaneously implemented.
Figure 12:
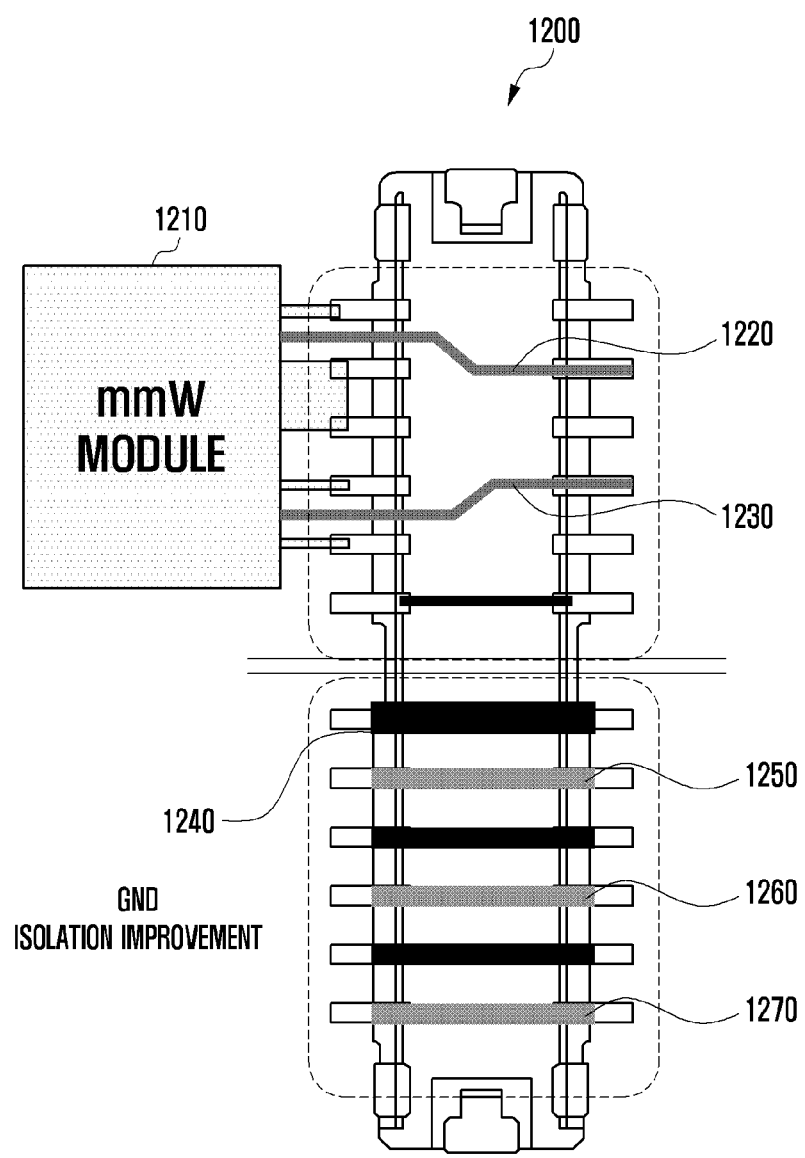
FIG. 12 illustrates a connector plug of a connector structure when multiple sub6 transmission paths are simultaneously implemented.

FIG. 11 illustrates a connector socket 1100 of a connector structure when multiple Sub6 transmission paths (Tx paths) are simultaneously implemented. FIG. 12 illustrates a connector plug 1200 of a connector structure when multiple Sub6 transmission paths (Tx paths) are simultaneously implemented.

Referring to FIG. 11 and FIG. 12, a connector structure (e.g., the connector structure 600 of FIG. 6) may be configured to simultaneously implement multiple Sub6 transmission paths (Tx paths) through a connector socket 1100 and a connector plug 1200. As an embodiment, when the connector socket 1100 and the connector plug 1200 are coupled to each other, a mmWave IF1 terminal 1110 and a mmWave module 1210 (e.g., the RFA 920 of FIG. 9) may be connected in a direct path through a first connection pin 1220.

As an embodiment, a mmWave IF2 terminal 1120 and a mmWave module 1210 may be connected in a direct path through a second connection pin 1230.

As an embodiment, ground terminals 1130 may be connected in a direct path through a third connection pin 1240.

As an embodiment, a first TRX input terminal 1142 and a first TRX output terminal 1144 may be connected in a direct path through a fourth connection pin 1250 so that an antenna part 1170 (e.g., a Sub6 antenna part) and a 5G modem (e.g., the 5G modem 950 of FIG. 9 and FIG. 10) are electrically connected to each other.

As an embodiment, a second TRX input terminal 1152 and a second TRX output terminal 1154 may be connected in a direct path through a fifth connection pin 1260 so that the antenna part 1170 (e.g., a Sub6 antenna part) and a 5G modem (e.g., the 5G modem 950 of FIG. 9 and FIG. 10) are electrically connected to each other.

As an embodiment, a third TRX input terminal 1162 and a third TRX output terminal 1164 may be connected in a direct path through a sixth connection pin 1270 so that the antenna part 1170 (e.g., a Sub6 antenna part) and a 5G modem (e.g., the 5G modem 950 of FIG. 9 and FIG. 10) are electrically connected to each other.

Figure 13:
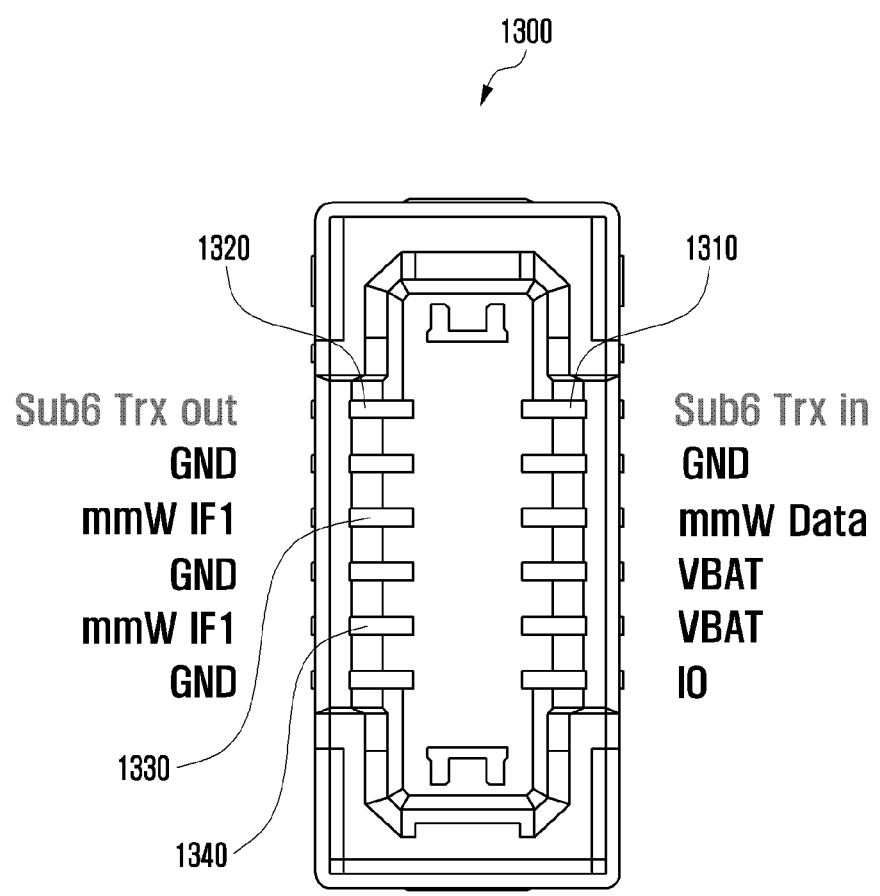
FIG. 13 illustrates a connector structure when mmWave and one sub6 transmission path are configured.

An electronic device according to various embodiments of the disclosure may be configured to simultaneously form multiple transmission (Tx) paths including a transmission path of a Sub6 antenna and a transmission path of a mmWave antenna through the connector socket 1100 and the connector plug 1200 of a connector structure (e.g., the connector structure 600 of FIG. 6). FIG. 13 illustrates a connector structure 1300 when mmWave and one Sub6 transmission path (Tx path) are configured.

Referring to FIG. 13, a connector structure 1300 (e.g., the connector structure 600 of FIG. 6) according to an embodiment of the disclosure may configure mmWave and one Sub6 transmission path (Tx path).

As an embodiment, a Sub6 Trx input terminal 1310 and a Sub6 Trx output terminal 1320 may be connected through a connection pin (e.g., the connection pin 720 of FIG. 7 and the connector socket 800 of FIG. 8) of a connector socket (e.g., the connector plug 700 of FIG. 7). A path (e.g., the path 495 of a first signal of FIG. 4) of a first signal in a UWB frequency band and/or a path (e.g., the path 498 of a second signal of FIG. 5) of a second signal in a Sub6 frequency band may be formed through a connector socket and a connector plug of a connector structure (e.g., the connector structure 600 of FIG. 6) even without the Sub6 RF switch 499 for an RF switch in a Sub6 frequency band.

Figure 14:
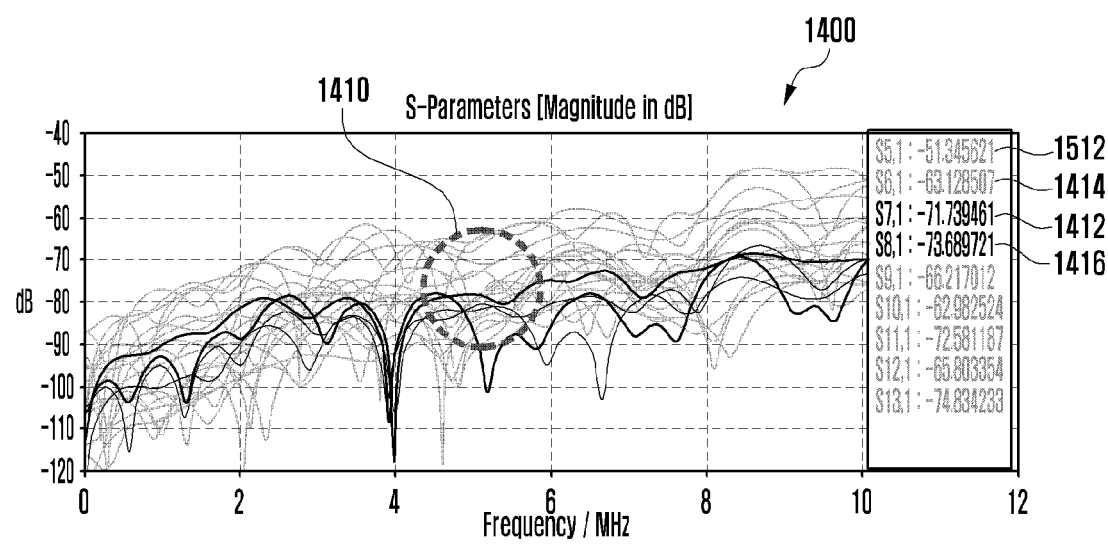
FIG. 14 illustrates an isolation characteristic when the distance between wires is great.
Figure 15:
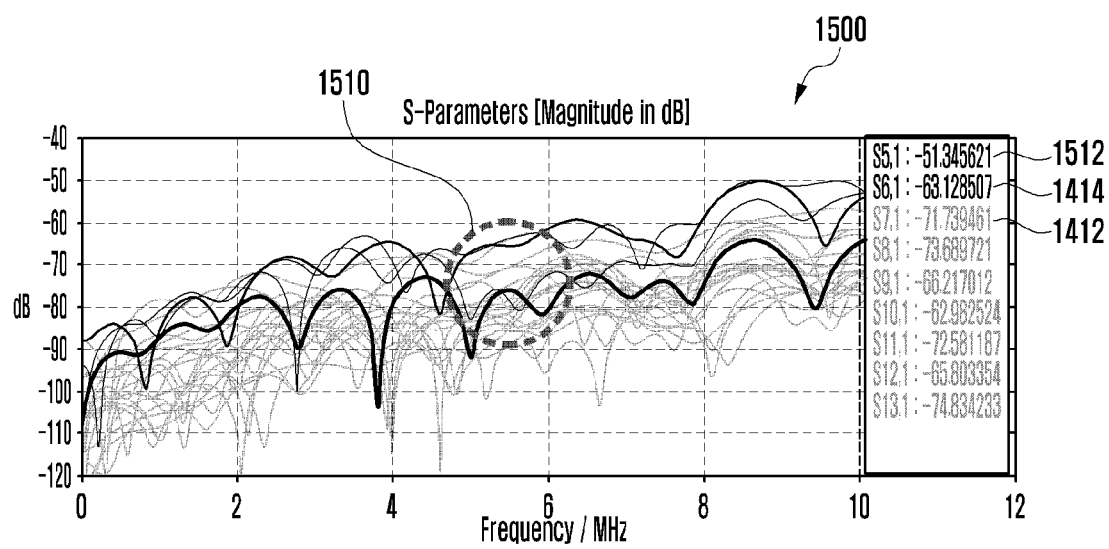
FIG. 15 illustrates an isolation characteristic when the distance between wires is small.

FIG. 14 is a graph 1400 illustrating an isolation characteristic when the distance between wires is great. FIG. 15 is a graph 1500 illustrating an isolation characteristic when the distance between wires is small. FIG. 16 illustrates an antenna performance for each frequency band when a connector structure according to an embodiment of the disclosure is applied to an electronic device.

Referring to FIG. 14 to FIG. 16, when a Sub6 (or a UWB) path, mmWave, and wire are closely arranged together, as illustrated in the area of focus 1410 in FIG. 14, an isolation characteristic between wires may be degraded.

As an embodiment, when compared to a first distance between a number 1 pin (e.g., the number 1 pin 1 of FIG. 11) and a number 5 pin (e.g., the number 5 pin 5 of FIG. 11) and a second distance between the number 1 pin (e.g., the number 1 pin 1 of FIG. 11) and a number 7 pin (e.g., the number 7 pin 7 of FIG. 11), the second distance is more distant than the first distance. Accordingly, as illustrated in the area of focus 1510 in FIG. 15, it may be identified that the value 1412 of isolation between the number 1 pin (e.g., the number 1 pin 1 of FIG. 11) and the number 7 pin (e.g., the number 7 pin 7 of FIG. 11) is lower than the value 1512 of isolation between the number 1 pin (e.g., the number 1 pin 1 of FIG. 11) and the number 5 pin (e.g., the number 5 pin 5 of FIG. 11).

As an embodiment, when compared to a third distance between the number 1 pin (e.g., the number 1 pin 1 of FIG. 11) and a number 6 pin (e.g., the number 6 pin 6 of FIG. 11) and a fourth distance between the number 1 pin (e.g., the number 1 pin 1 of FIG. 11) and a number 8 pin (e.g., the number 7 pin 7 of FIG. 11), the fourth distance is more distant than the third distance. Accordingly, the value 1414 of isolation between the number 1 pin (e.g., the number 1 pin 1 of FIG. 11) and the number 6 pin (e.g., the number 6 pin 6 of FIG. 11) may be lower than the value 1416 of isolation between the number 1 pin (e.g., the number 1 pin 1 of FIG. 11) and the number 8 pin (e.g., the number 8 pin 8 of FIG. 11).

When the connector structure 600 according to an embodiment of the disclosure illustrated in FIG. 6 is applied to an electronic device, even though a Sub6 (or a UWB) path is positioned between mmWave and the wires, it may be identified that the isolation characteristic is excellent.

According to an embodiment, in order to improve the characteristic of isolation between a Sub6 (or a UWB) path, mmWave, and a wire, a ground path may be additionally formed between a Sub6 (or a UWB) path, mmWave, and a wire.

As illustrated in FIG. 16, in the case of the comparison example, embodiments according to this disclosure are enabled to obtain a wireless communication transmission efficiency of about −75 dB in 10 MHz-1 GHz frequency band. In addition, embodiments according to this disclosure are enabled to obtain a wireless communication transmission efficiency of about −70 dB in 1-6 GHz frequency band. In addition, embodiments according to this disclosure are enabled to obtain a wireless communication transmission efficiency of about −65 dB in 6-10 GHz frequency band. When the connector structure 600 according to an embodiment of the disclosure illustrated in FIG. 6 is applied to an electronic device, embodiments according to this disclosure are enabled to obtain a wireless communication transmission efficiency of about −65 dB in 0-2.1 GHz frequency band. In addition, embodiments according to this disclosure are enabled to obtain a wireless communication transmission efficiency of about −60 dB in 2.5-4 GHz frequency band. In addition, embodiments according to this disclosure are enabled to obtain a wireless communication transmission efficiency of about −50 dB in a frequency band of 8 GHz or more.

Figure 17:
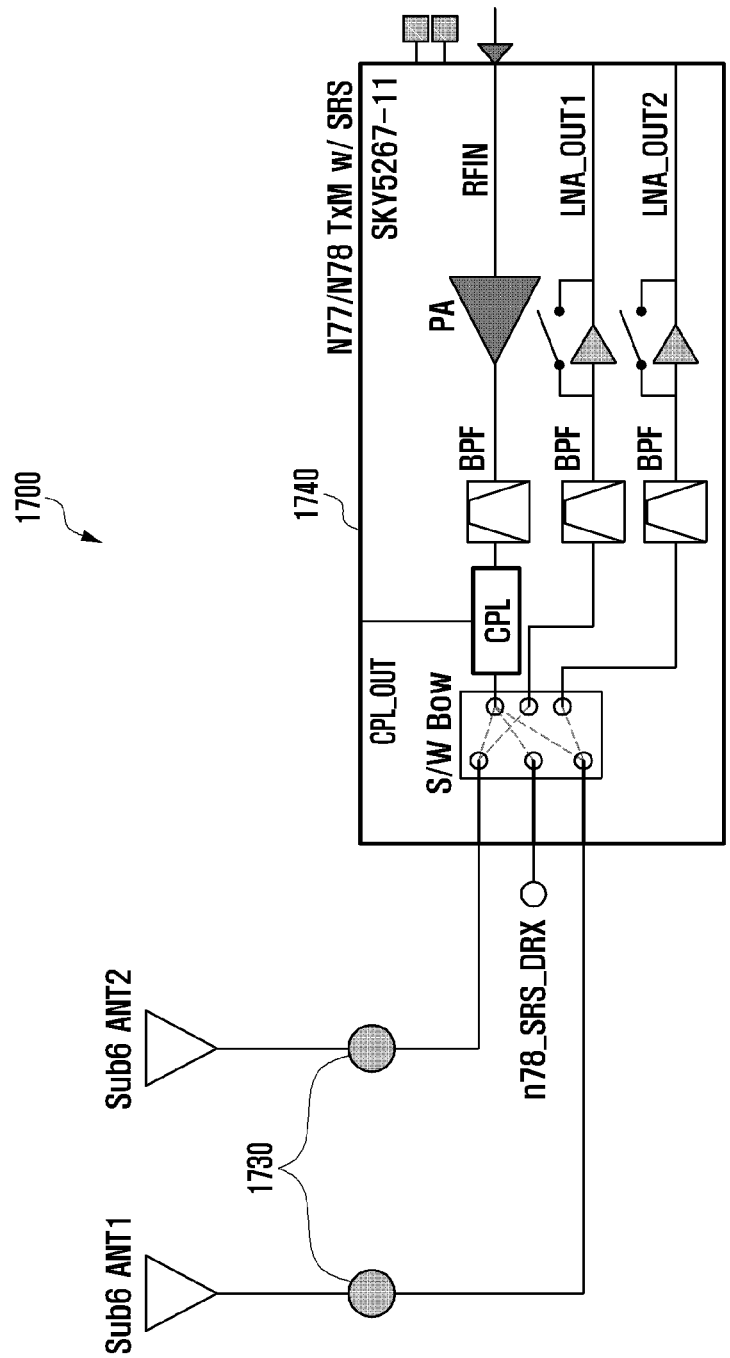
FIG. 17 illustrates a sounding reference signal switching method of a sub6 antenna.

FIG. 17 illustrates a sounding reference signal (SRS) switching method of a Sub6 antenna.

Referring to FIG. 17, an electronic device 1700 may include a Sub6 RF switch 1730 for switching a first Sub6 antenna 1710 and a second Sub6 antenna 1720, and a sounding reference signal (SRS) switch part 1740. The performance of a transmission antenna may be degraded according to that a user grips the electronic device 1700, but sounding reference signal (SRS) switching between the first Sub6 antenna 1710 and the second Sub6 antenna 1720 may be performed using a connector structure (e.g., the connector structure 600 of FIG. 6) and the sounding reference signal (SRS) switch part 1740 according to an embodiment of the disclosure.

As an embodiment, when the connector structure 600 according to an embodiment of the disclosure illustrated in FIG. 6 is applied to an electronic device, the connector structure 600 may replace a function of the Sub6 RF switch 1730, and thus the Sub6 RF switch 1730 may be removed. Therefore, embodiments according to this disclosure are enabled to secure a mounting space of an electronic component for the sounding reference signal (SRS) switching between the first Sub6 antenna 1710 and the second Sub6 antenna 1720.

Figure 18:
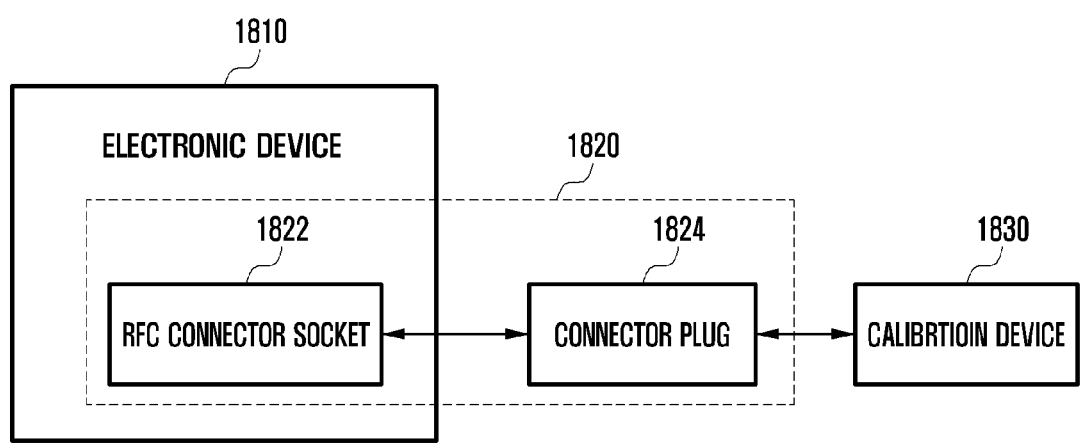
FIG. 18 illustrates a block diagram illustrating a feature of connecting a connector structure and a calibration device according to an embodiment of the disclosure when a sub6 antenna calibration is performed.

FIG. 18 illustrates a block diagram of a feature of connecting a connector structure and a calibration device according to an embodiment of the disclosure when a Sub6 antenna calibration is performed.

Referring to FIG. 18, an electronic device 1810 may include a FRC connector socket 1822 (e.g., the connector socket 800 of FIG. 8) of a connector structure (e.g., the connector structure 600 of FIG. 6). A flexible circuit board may include a connector plug (e.g., the connector plug 700 of FIG. 7) of a connector structure (e.g., the connector structure 600 of FIG. 6).

As an embodiment, the FRC connector socket 1822 (e.g., the connector socket 800 of FIG. 8) and the connector plug (e.g., the connector plug 700 of FIG. 7) may be fastened to be electrically connected to each other, and the electronic device 1810 and a calibration device 1830 may be electrically connected through the FRC connector socket 1822 (e.g., the connector socket 800 of FIG. 8) and the connector plug (e.g., the connector plug 700 of FIG. 7).

Figure 19:
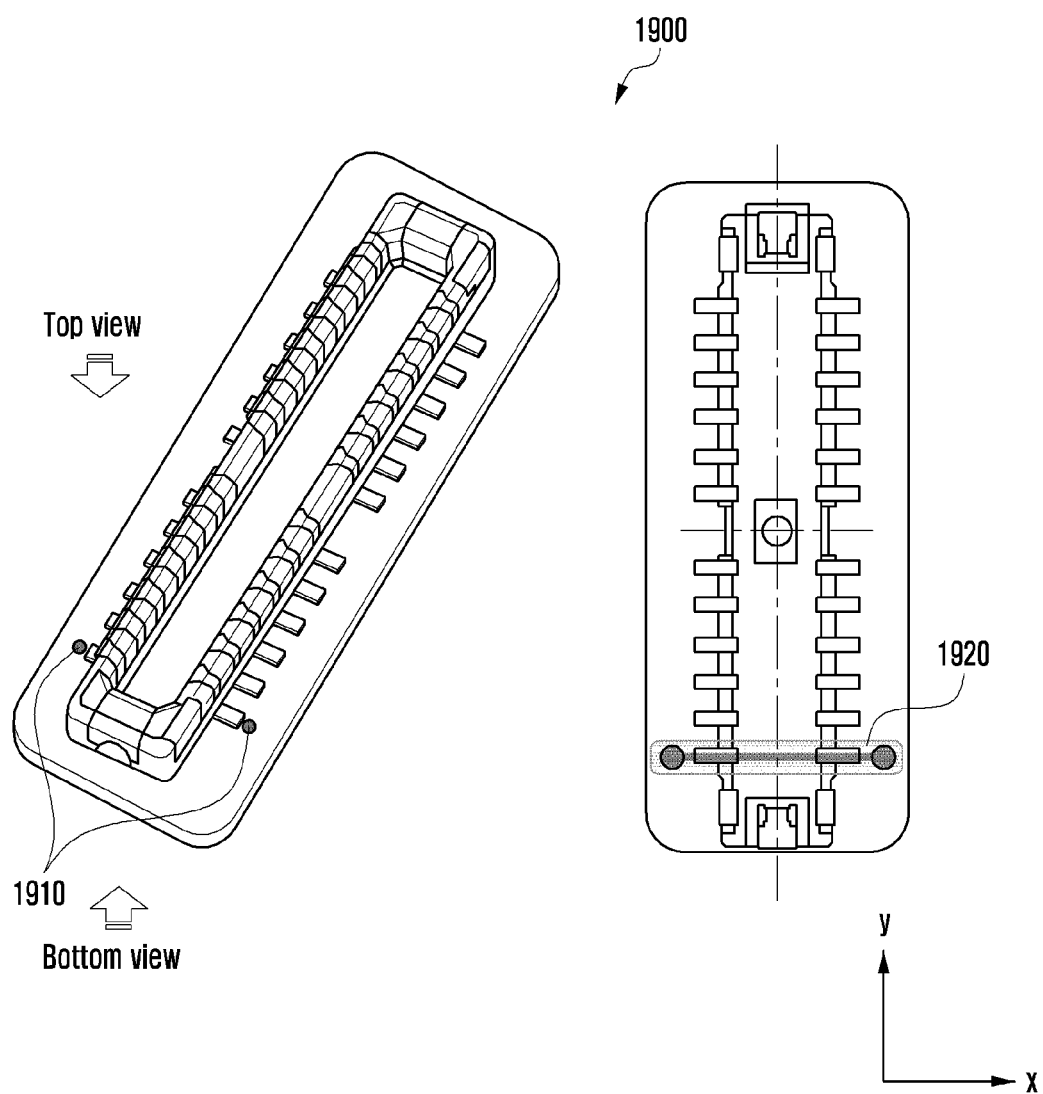
FIG. 19 illustrates a feature of vertically forming a connecting wire with reference to a major axis in a FRC connector plug of a connector structure.

FIG. 19 illustrates a feature of vertically (e.g., the x-axis direction) forming a connecting wire 1920 with reference to a major axis (e.g., the y-axis) in a FRC connector plug 1824 and 1900 of a connector structure.

Referring to FIG. 18 and FIG. 19, in a state where the FRC connector socket 1822 (e.g., the connector socket 800 of FIG. 8) and a connector plug 1824 and 1900 (e.g., the connector plug 700 of FIG. 7) are not fastened, the connection with a Sub6 antenna part (e.g., the antenna part 1170 of FIG. 11) may be terminated (an open state, transmit and receive (TRX) input and output (TRX_in1/TRX_out1)), and thus the calibration of a sub antenna of an electronic device may be performed through the connection between a connector structure 1820 (e.g., the connector structure 600 of FIG. 6) and the calibration device 1830.

As an embodiment, by vertically (e.g., the x-axis direction) forming a connecting wire 1920 with reference to a major axis (e.g., the y-axis direction) in the FRC connector plug 1824 and 1900 (e.g., the connector plug 700 of FIG. 7), plug pins 1910 (e.g., an RF signal pins) of the FRC connector plug 1824 and 1900 may be directly connected to each other.

Figure 20:
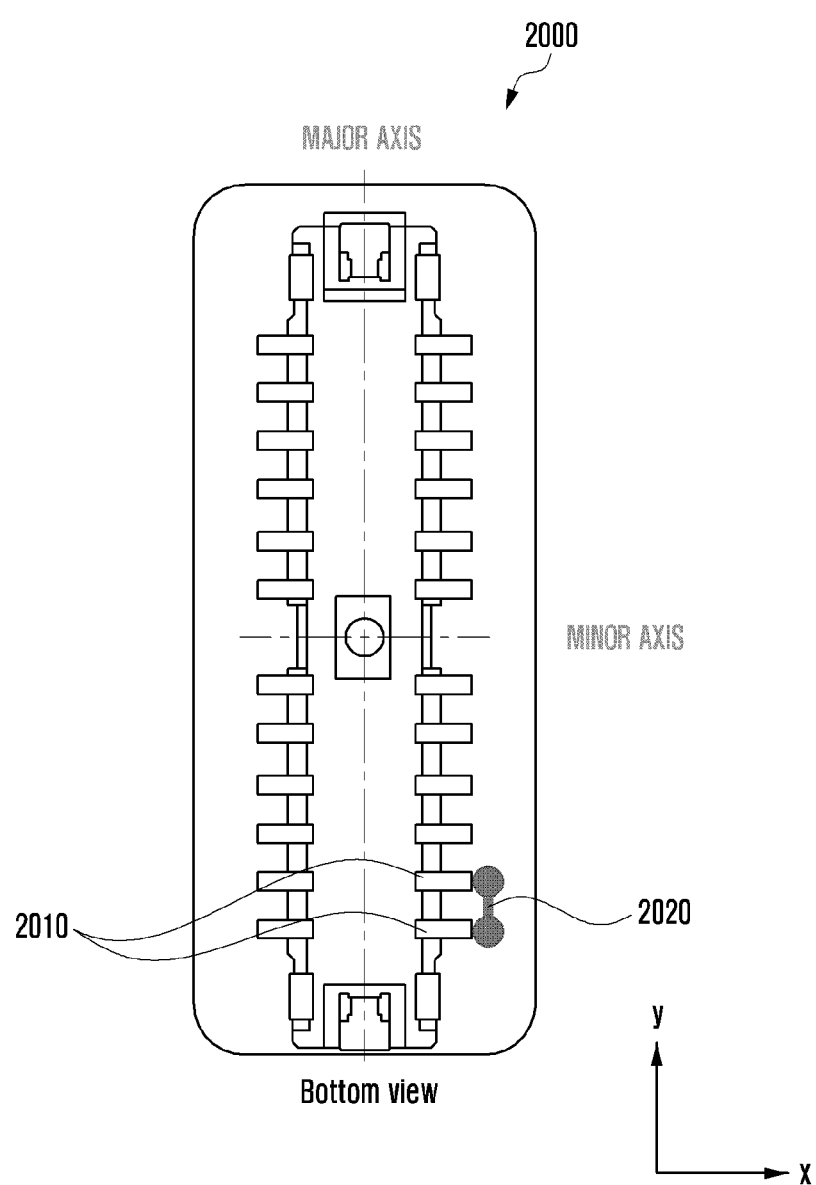
FIG. 20 illustrates a feature of horizontally forming a connecting wire with reference to a major axis in a FRC connector plug of a connector structure.

FIG. 20 illustrates a feature of horizontally (e.g., the y-axis direction) forming a connecting wire 2020 with reference to a major axis (e.g., the y-axis) in a FRC connector plug 2000 of a connector structure.

Referring to FIG. 18 and FIG. 20, by horizontally (e.g., the y-axis direction) forming a connecting wire 2020 with reference to a major axis (e.g., the y-axis direction) in FRC connector plugs 1824 and 2000 (e.g., the connector plug 700 of FIG. 7), plug pins 2010 (e.g., an RF signal pins) of the FRC connector plug 1824 and 2000 may be directly connected to each other.

Not limited thereto, the connector structure 1820 (e.g., the connector structure 600 of FIG. 6) according to an embodiment of the disclosure may be applied to a plug and a socket of a connector of a UWB FRC and a key FPCB, in addition to a mmWave FRC.

Even the case where the connector structure 1820 (e.g., the connector structure 600) according to an embodiment of the disclosure is applied to a plug and a socket of a connector of a UWB FRC and a key FPCB, embodiments according to this disclosure are enabled to implement a calibration point, to secure a mounting space of an electronic component, and to implement SRS antenna switching.

As another embodiment, a Sub6 and a UWB path may be formed together in the connector structure 1820 (e.g., the connector structure 600 of FIG. 6) together. When a Sub6 and a UWB path are formed together, embodiments according to this disclosure are enabled to perform the calibration of a Sub6 and a UWB at once.

Figure 21:
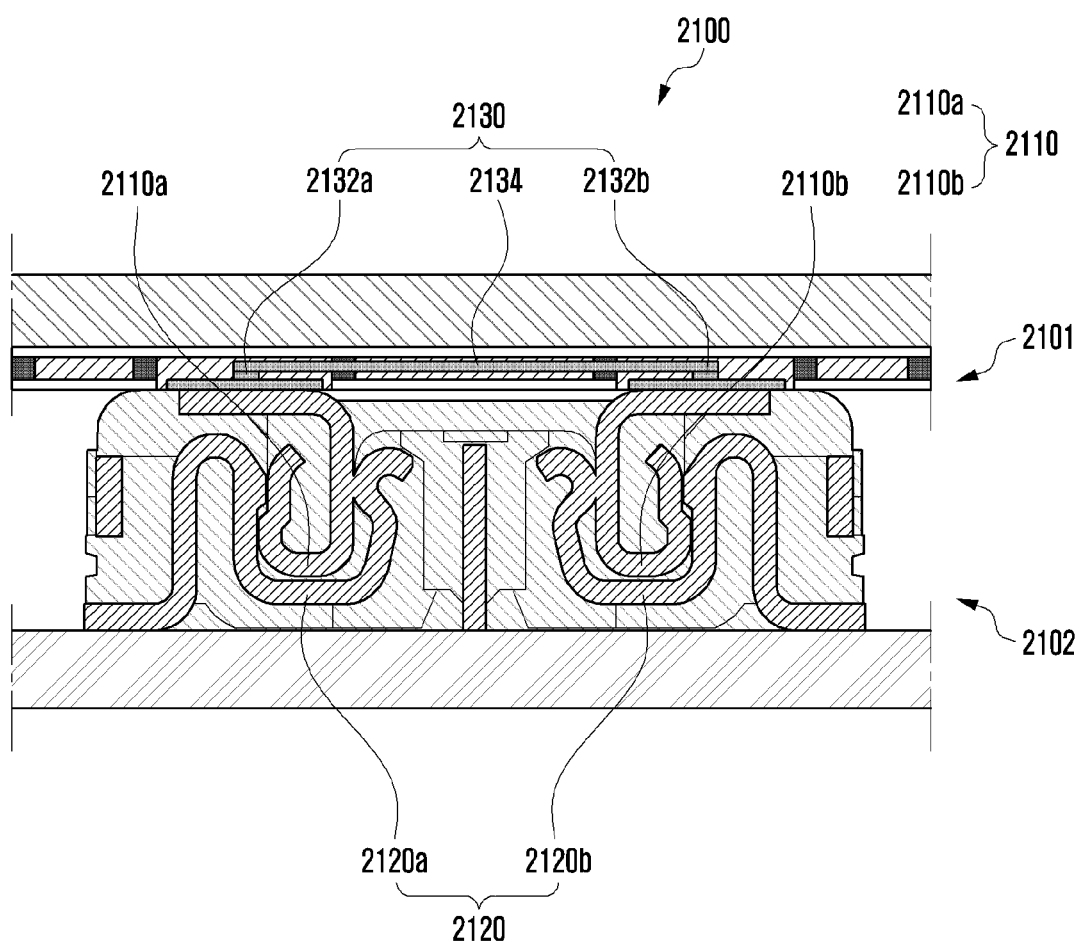
FIG. 21 illustrates a feature of connecting a signal wire of a connector structure according to various embodiments of the disclosure.

FIG. 21. illustrates a feature of connecting a signal wire of a connector structure 2100 according to various embodiments of the disclosure.

Referring to FIG. 21, a sub6 antenna transmission path wire, which is formed in 50 ohms, may be formed on a flexible circuit board, and a 5G modem (e.g., the 5G modem 950 of FIG. 9) and a sub6 antenna (e.g., the antenna part 960 of FIG. 9) may be electrically connected through a connector structure 2100.

According to an embodiment, the connector structure 2100 may include plug terminals 2110 of a connector plug 2101, socket terminals 2120 of a connector socket 2102, and a connection wire part 2130.

According to an embodiment, the connection wire part 2130 may include the first via 2132*a* electrically connected to the first plug terminal 2110*a*, the second via 2132*b* electrically connected to the second plug terminal 2110*b*, and the wire 2134 configured to connect the first via 2132*a* and the second via 2132*b*. The plug terminals 2110 of the connector plug 2101 may be electrically connected by the connection wire part 2130. A first socket terminal 2120*a* and a second socket terminal 2120*b* of the socket terminals 2120 may be electrically connected by the plug terminals 2110 of the connector plug 2101.

When a shielding is required due to a close physical distance between a mmWave transmission wire and a sub6 antenna transmission wire, embodiments according to this disclosure are enabled to secure an isolation between the mmWave transmission wire and the sub6 antenna transmission wire through the connection wire part 2130.

Figure 22:
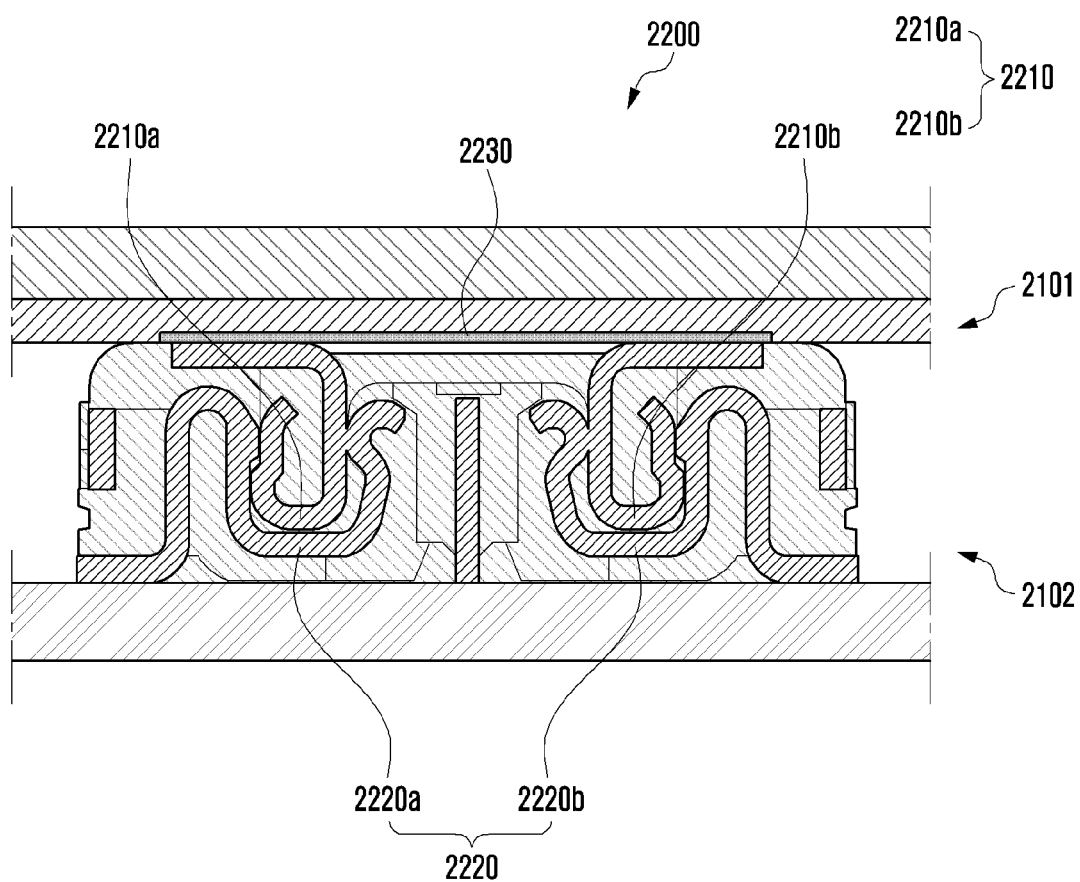
FIG. 22 illustrates a feature of connecting a signal wire of a connector structure according to various embodiments of the disclosure.

FIG. 22. illustrates a feature of connecting a signal wire of a connector structure according to various embodiments of the disclosure.

Referring to FIG. 22, a sub6 antenna transmission path wire, which is formed in 50 ohms, may be formed on a flexible circuit board, and a 5G modem (e.g., the 5G modem 950 of FIG. 9) and a sub6 antenna (e.g., the antenna part 960 of FIG. 9) may be electrically connected through a connector structure 2200.

According to an embodiment, the connector structure 2200 may include plug terminals 2210 of a connector plug 2201, socket terminals 2220 of a connector socket 2202, and a connecting wire 2230. The connecting wire 2230 may be electrically connected to a first plug terminal 2210*a* and a second plug terminal 2210*b*. The plug terminals 2210 of the connector plug 2201 may be electrically connected by the connecting wire 2230. A first socket terminal 2220*a* and a second socket terminal 2220*b* of the socket terminals 2220 may be electrically connected by the plug terminals 2210 of the connector plug 2201.

When a shielding is required due to a close physical distance between a mmWave transmission wire and a sub6 antenna transmission wire, embodiments according to this disclosure are enabled to secure an isolation between the mmWave transmission wire and the sub6 antenna transmission wire through the connecting wire 2230.

An electronic device (e.g., the electronic device 101 of FIG. 2 and FIG. 3, the electronic device 400 of FIG. 4 and FIG. 5, the electronic device 900 of FIG. 9, the electronic device 1700 of FIG. 17, and the electronic device 1810 of FIG. 18) according to various embodiments of the disclosure may include a first wireless communication path, a second wireless communication path, and a connector structure (e.g., the connector structure 600 of FIG. 6, the connector structure 1300 of FIG. 13, the connector structure 1820 of FIG. 18, the connector structure 2100 of FIG. 21, and the connector structure 2200 of FIG. 22). The first wireless communication path may be configured to enable wireless communication in a first frequency band. The first wireless communication path may include a first frequency signal processing module (e.g., the RFA 920 of FIG. 9), a flexible circuit board (e.g., the first flexible circuit board 493, the second flexible circuit board 496, and the flexible circuit board 910), a second frequency signal processing module (e.g., the RFB 940 of FIG. 9), and a wireless communication modem (e.g., the modem 466 of FIG. 4 and FIG. 5, and the 5G modem 950 of FIG. 9). The second wireless communication path may be configured to enable wireless communication in a second frequency band. The second wireless communication path may include an antenna part (e.g., the antenna 960 of FIG. 9) formed by segmentation of a metal bezel (e.g., the metal bezel 970 of FIG. 9), and the flexible circuit board (e.g., the first flexible circuit board 493 of FIG. 4 and FIG. 5, the second flexible circuit board 496 of FIG. 4 and FIG. 5, and the flexible circuit board 910 of FIG. 9). The connector structure 600, 1300, 1820, 2100, and 2200 may include a connector plug (e.g., the connector plug 700 of FIG. 7, the connector plug 912 of FIG. 9, the connector plug 1200 of FIG. 12, the connector plug 1824 of FIG. 18, the connector plug 2000 of FIG. 20, the connector plug 2101 of FIG. 21, and the connector plug 2201 of FIG. 22) and a connector socket (e.g., the connector socket 800 of FIG. 8, the connector socket 1100 of FIG. 11, the connector socket 1822 of FIG. 18, the connector socket 2102 of FIG. 21, and the connector socket 2202 of FIG. 22). The connector structure 600, 1300, 1820, 2100, and 2200 may include the connector plug 700, 912, 1200, 1824, 2000, 2101, and 2201 which is electrically connected to a flexible circuit board (e.g., the first flexible circuit board 493, the second flexible circuit board 496, and the flexible circuit board 910) disposed in the electronic device 101, 400, 900, 1700, and 1810, and the connector socket 800, 1100, 1822, 2102, and 2202 which is electrically connected to a printed circuit board (e.g., the first circuit board 460 of FIG. 4 and FIG. 5, the second circuit board 470 of FIG. 4 and FIG. 5, and the first PCB 930 of FIG. 9) disposed in the electronic device 101, 400, 900, 1700, and 1810. The connector plug 700, 912, 1200, 1824, 2000, 2101, and 2201 may include a connection pin 720 configured to electrically connect a first plug pin 710*a* disposed at a first side thereof and a second plug pin 710*b* disposed at a second side.

According to an embodiment, the flexible circuit board (e.g., the first flexible circuit board 493, the second flexible circuit board 496, and the flexible circuit board 910) and the printed circuit board (e.g., the first circuit board 460, the second circuit board 470, and the first PCB 930) may be electrically connected by the connector plug 700, 912, 1200, 1824, 2000, 2101, and 2201 and the connector socket 800, 1100, 1822, 2102, and 2202 to form the first wireless communication path.

According to an embodiment, the first frequency signal processing module (e.g., the RFA 920) and the second frequency signal processing module (e.g., the RFB 940) may be electrically connected by the first wireless communication path.

According to an embodiment, the electronic device may be configured to transmit or receive a signal in a mmWave frequency band by the first wireless communication path.

According to an embodiment, the antenna part 960 and the wireless communication modem (e.g., the modem 466 and the 5G modem 950) may be electrically connected by the connector plug 700, 912, 1200, 1824, 2000, 2101, and 2201 and the connector socket 800, 1100, 1822, 2102, and 2202 to form the second wireless communication path.

According to an embodiment, the antenna part 960 and a communication processor (e.g., the auxiliary processor 123 of FIG. 1) disposed on the printed circuit board (e.g., the first circuit board 460, the second circuit board 470, and the first PCB 930) may be electrically connected by the second wireless communication path.

According to an embodiment, the electronic device may be configured to transmit or receive a signal in a Sub6 frequency band by the second wireless communication path.

According to various embodiments, the first frequency band may be 20 GHz or more.

According to various embodiments, the second frequency band may be 12 GHz or less.

According to an embodiment, the wireless communication modem (e.g., the modem 466 and the 5G modem 950) may be a 5G modem.

In connection with a connector structure 600, 1300, 1820, 2100, and 2200 according to various embodiments of the disclosure, a connector structure 600, 1300, 1820, 2100, and 2200 of an electronic device 101, 400, 900, 1700, and 1810 may include a connector plug 700, 912, 1200, 1824, 2000, 2101, and 2201 and a connector socket 800, 1100, 1822, 2102, and 2202. The connector plug 700, 912, 1200, 1824, 2000, 2101, and 2201 may be electrically connected to a flexible circuit board (e.g., the first flexible circuit board 493, the second flexible circuit board 496, and the flexible circuit board 910) disposed on the electronic device 101, 400, 900, 1700, and 1810. The connector socket 800, 1100, 1822, 2102, and 2202 may be electrically connected to a printed circuit board (e.g., the first printed circuit board 460, the second printed circuit board 470, and the first PCB 930) disposed on the electronic device 101, 400, 900, 1700, and 1810. In connection with the connector plug 700, 912, 1200, 1824, 2000, 2101, and 2201, the connector plug 700, 912, 1200, 1824, 2000, 2101, and 2201 may include multiple plug pins (e.g., the multiple plug pins 710 of FIG. 7) and at least one connection pin (e.g., the connection pin 720 of FIG. 7) configured to directly connect at least some of the multiple plug pins 710.

According to an embodiment, the connection pin 720 may be configured to electrically connect a first plug pin (e.g., the first plug pin 710a of FIG. 7) disposed at a first side of the connector plug 700, 912, 1200, 1824, 2000, 2101, and 2201 and a second plug pin (e.g., the second plug pin 710b of FIG. 7) disposed at a second side of the connector plug 700, 912, 1200, 1824, 2000, 2101, and 2201.

According to an embodiment, the connector socket 800, 1100, 1822, 2102, and 2202 may include a first socket pin (e.g., the first socket pin 810a FIG. 8) disposed at a first side of the connector socket 800, 1100, 1822, 2102, and 2202 and a second socket pin (e.g., the second socket pin 810b FIG. 8) disposed at a second side of the connector socket 800, 1100, 1822, 2102, and 2202. The first plug pin 710a and the first socket pin 810a may be electrically connected to each other. The second plug pin 710b and the second socket pin 810b may be electrically connected to each other.

According to an embodiment, the connection pin 720 may be configured to electrically connect the first plug pin 710a and the second plug pin 710b which are vertically arranged with reference to a first direction of the connector plug 700, 912, 1200, 1824, 2000, 2101, and 2201.

According to an embodiment, the connection pin 720 may be configured to electrically connect the first plug pin 710a and the second plug pin 710b which are horizontally arranged with reference to a first direction of the connector plug 700, 912, 1200, 1824, 2000, 2101, and 2201.

According to an embodiment, the connector structure may be configured to connect a first frequency signal processing module (e.g., the RFA 920) and a second frequency signal processing module (e.g., the RFB 940) of the electronic device 101, 400, 900, 1700, and 1810 through the connector socket 800, 1100, 1822, 2102, and 2202 and the connector plug 700, 912, 1200, 1824, 2000, 2101, and 2201.

According to an embodiment, the flexible circuit board (e.g., the first flexible circuit board 493, the second flexible circuit board 496, and the flexible circuit board 910) and the printed circuit board (e.g., the first circuit board 460, the second circuit board 470, and the first PCB 930) may be electrically connected by the connector plug 700, 912, 1200, 1824, 2000, 2101, and 2201 and the connector socket 800, 1100, 1822, 2102, and 2202 to form a first wireless communication path in a first frequency band.

According to an embodiment, the connector structure may be configured to transmit or receive a signal in a mmWave frequency band by the first wireless communication path.

According to an embodiment, the flexible circuit board (e.g., the first flexible circuit board 493, the second flexible circuit board 496, and the flexible circuit board 910) and the printed circuit board (e.g., the first circuit board 460, the second circuit board 470, and the first PCB 930) may be electrically connected by the connector plug 700, 912, 1200, 1824, 2000, 2101, and 2201 and the connector socket 800, 1100, 1822, 2102, 2202 to form a second wireless communication path in a second frequency band.

According to an embodiment, the connector structure may be configured to transmit or receive a signal in a Sub6 frequency band by the second wireless communication path.

Although the present disclosure has been described with various embodiments, various changes and modifications may be suggested to one skilled in the art. It is intended that the present disclosure encompass such changes and modifications as fall within the scope of the appended claims.

What is claimed is:

1. A connector structure of an electronic device, the connector structure comprising:
   a connector plug electrically connected to a flexible circuit board disposed in the electronic device; and
   a connector socket electrically connected to a printed circuit board disposed in the electronic device, wherein
   the connector plug comprises multiple plug pins and at least one connection pin configured to directly connect at least some of the multiple plug pins,
   wherein the connection pin is configured to electrically connect a first plug pin disposed at a first side of the connector plug and a second plug pin disposed at a second side of the connector plug.

2. The connector structure of claim 1, wherein the connector socket comprises a first socket pin disposed at a first side of the connector socket and a second socket pin disposed at a second side of the connector socket,
   wherein the first plug pin and the first socket pin are electrically connected, and
   wherein the second plug pin and the second socket pin are electrically connected.

3. The connector structure of claim 1, wherein the connection pin is configured to electrically connect a first plug pin and a second plug pin, which are vertically arranged with reference to a first direction of the connector plug.

4. The connector structure of claim 1, wherein the connection pin is configured to electrically connect a first plug pin and a second plug pin, which are horizontally arranged with reference to a first direction of the connector plug.

5. The connector structure of claim 1, configured to connect a first frequency signal processing circuit and a second frequency signal processing circuit of the electronic device through the connector socket and the connector plug.

6. The connector structure of claim 1, wherein the flexible circuit board and the printed circuit board are electrically connected by the connector plug and by the connector socket to form a first wireless communication path in a first frequency band.

7. The connector structure of claim 6, configured to transmit or receive a signal in a mm Wave frequency band by the first wireless communication path.

8. The connector structure of claim 1, wherein the flexible circuit board and the printed circuit board are electrically connected by the connector plug and the connector socket to form a second wireless communication path in a second frequency band.

9. The connector structure of claim 8, configured to transmit or receive a signal in a Sub6 frequency band by the second wireless communication path.

* * * * *